United States Patent [19]

Templeton et al.

[11] Patent Number: 5,679,940
[45] Date of Patent: Oct. 21, 1997

[54] TRANSACTION SYSTEM WITH ON/OFF LINE RISK ASSESSMENT

[75] Inventors: Randy Joe Templeton, Bellaire; Gerald Gulden, Houston, both of Tex.

[73] Assignee: TeleCheck International, Inc., Houston, Tex.

[21] Appl. No.: 565,981

[22] Filed: Dec. 1, 1995

Related U.S. Application Data

[62] Division of Ser. No. 349,734, Dec. 2, 1994.

[51] Int. Cl.⁶ ............................. G06F 17/60; G06K 5/00
[52] U.S. Cl. ............................................... 235/380; 235/379
[58] Field of Search .................................. 235/375, 380, 235/381, 382; 364/408, 401, 406; 340/825.33, 825.35

[56] References Cited

U.S. PATENT DOCUMENTS

| | | | |
|---|---|---|---|
| 4,187,498 | 2/1980 | Creekmore | 340/149 |
| 4,472,626 | 9/1984 | Frid | 235/379 |
| 4,672,377 | 6/1987 | Murphy et al. | 340/825 |
| 4,734,564 | 3/1988 | Boston et al. | 235/379 |
| 4,758,714 | 7/1988 | Carlson et al. | 235/380 |
| 4,810,866 | 3/1989 | Lord, Jr. | 235/379 |
| 4,812,628 | 3/1989 | Boston et al. | 235/380 |
| 4,822,985 | 4/1989 | Boggan et al. | 235/380 |
| 4,872,113 | 10/1989 | Dinerstein | 364/401 |
| 4,908,521 | 3/1990 | Boggan et al. | 235/380 |
| 4,943,707 | 7/1990 | Boggan | 235/380 |
| 5,023,782 | 6/1991 | Lutz et al. | 364/405 |
| 5,053,607 | 10/1991 | Carlson et al. | 235/379 |
| 5,175,682 | 12/1992 | Higashiyama et al. | 364/408 |
| 5,177,342 | 1/1993 | Adams | 235/379 |
| 5,201,010 | 4/1993 | Deaton et al. | 382/7 |
| 5,231,569 | 7/1993 | Myatt et al. | 364/408 |
| 5,357,563 | 10/1994 | Hamilton et al. | 379/91 |
| 5,384,449 | 1/1995 | Peirce | 235/380 |

*Primary Examiner*—Donald T. Hajec
*Assistant Examiner*—Thien Minh Le
*Attorney, Agent, or Firm*—Jones & Askew

[57] ABSTRACT

A check acceptance system provides interactive authorizations and off-line terminal approvals. A merchant uses an interactive transaction terminal to communicate with a check acceptance service's authorization host computer. The terminal includes an electronic check reader and a magnetic stripe reader for reading magnetic stripe drivers licenses. The terminal acquires transaction data associated with a pending check transaction. The transaction data is analyzed to determine whether the transaction can be approved by the terminal. If so, an approval code is generated and a transaction packet including the transaction data and terminal approval code are stored in the terminal until subsequent communication with the host computer. If the pending transaction is not approved by the terminal, the transaction data is transmitted to the host computer. The host computer applies a risk scoring algorithm to the data to determine whether the transaction should be approved, declined, or whether additional information is needed. If the transaction is approved or declined, a response packet including authorization indicia is transmitted to the terminal. If additional data is needed, the host computer transmits prompts to the terminal. The terminal displays the prompts and the merchant enters the requested data into the terminal. A new transaction packet including the original transaction data and the additional requested data is transmitted to the host computer, where it is approved or declined.

47 Claims, 8 Drawing Sheets

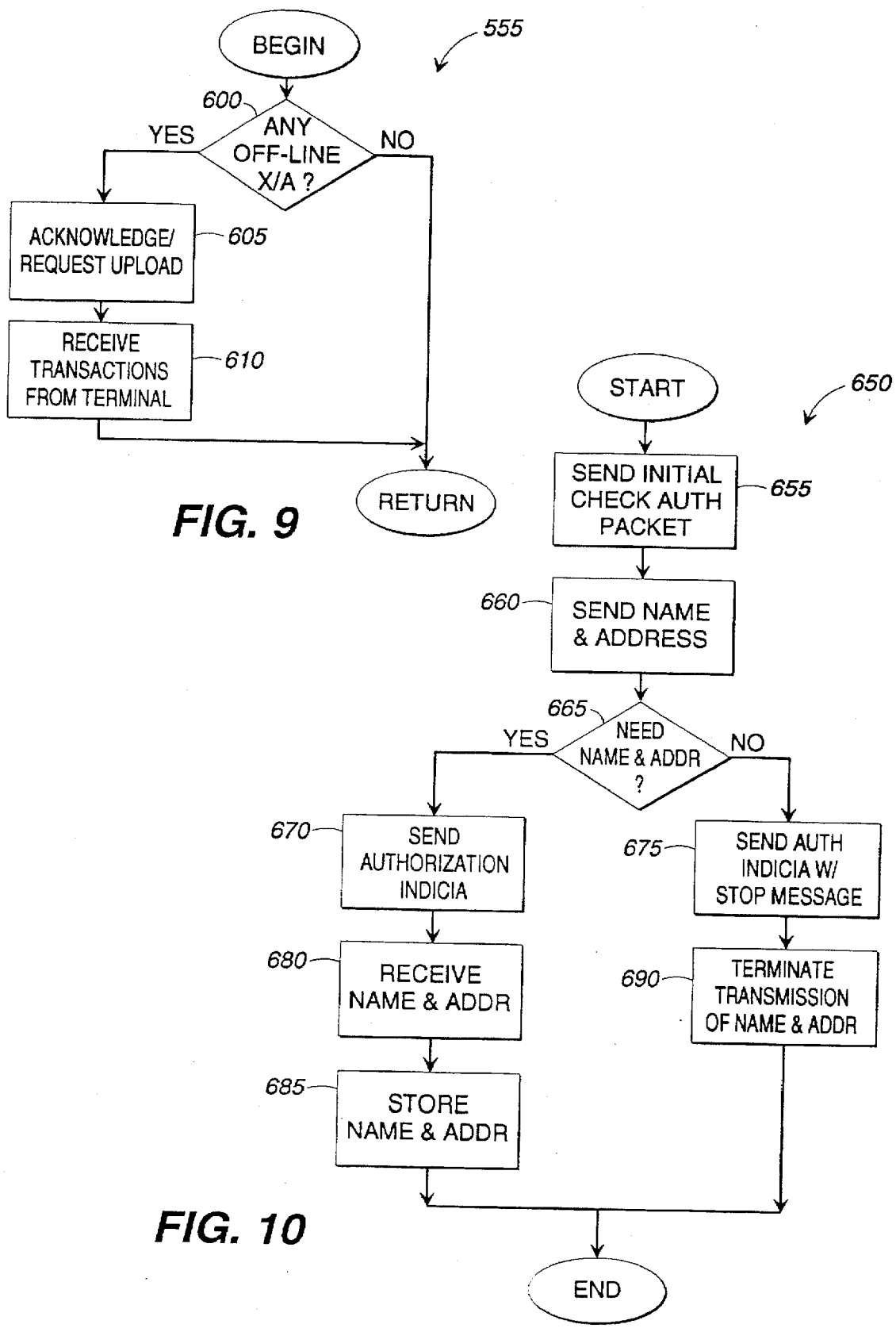

TRANSACTION SYSTEM WITH ON/OFF LINE RISK ASSESSMENT

This is a division of U.S. application Ser. No. 08/349,734, filed Dec. 2, 1994 now pending.

TECHNICAL FIELD

The present invention relates generally to check acceptance systems, and relates more particularly to methods and systems for interactive check authorizations using an electronic transaction terminal for acquiring transaction data at the point of sale.

BACKGROUND OF THE INVENTION

Checks make up the nation's largest non-cash form of payment. It is estimated that approximately 90% of American households use checks to pay for retail purchases, and that over 30% of the transactions completed at the point of sale are paid for with checks. It is also estimated that the average value of retail check sales is almost 20% higher than the average retail sale. In 1991, the value of checks tendered at the point of sale exceeded $650 billion.

Because so many customers prefer to pay with checks, many merchants accept checks from their customers as payment for goods and/or services. Acceptance of checks and other non-cash forms of payment provides a significant convenience for customers by making it possible to purchase goods and/or services without having to tender cash for each transaction. This eliminates the need to carry large amounts of cash, which is seldom recovered in the event it is lost or stolen. Merchants also benefit by attracting customers who prefer to shop at stores that accept checks.

Despite its advantages, accepting checks exposes the merchant to the risk that the check will be bad, and will not be honored by the customer's bank. This typically occurs in cases where the account on which the check was drawn has insufficient funds, or if the check had been forged. In most cases where a check is bad, merchants find it difficult, if not impossible, to collect payment or repossess the goods.

In light of the potential losses associated with accepting checks, merchants have sought ways to accurately differentiate between good checks and bad checks. Accuracy is essential because merchants want to reject as many bad checks as possible while also rejecting as few good checks as possible. Due to the nature of a retail environment, a merchant's decision to accept or reject a check must be made prior to completion of the transaction, and must be made quickly while customers wait.

Some smaller merchants may be satisfied with fairly simple precautions. For example, a merchant may determine that it is willing to accept checks only from regular customers who are known to it. This method is obviously of little value for businesses such as grocery and department stores, which typically have a large number of customers and a relatively large number of cashiers. In settings where customers are not personally known to the merchant, some merchants are willing to accept checks if other criteria are satisfied, such as the check being drawn on a local bank and the customer presents additional identification.

In order to provide merchants with additional information and with greater levels of confidence regarding checks presented by customers, third party vendors offer on-line check acceptance services. In most cases, a check acceptance service provides an authorization indicia to the merchant in response to transaction data acquired at the point of sale. The merchant provides transaction data to the check acceptance service via voice or data telephone communication. The check acceptance service's authorization host computer analyzes this data in conjunction with other relevant data to determine the probability of that particular check being good or bad. The check acceptance service compares that probability to the merchant's risk parameters and provides a response code to the merchant indicating whether the check should be declined or accepted, or whether additional information is required.

Check acceptance services typically offer two types of services: check "verification" and check "guarantee." In both cases, the check acceptance service's authorization host computer determines the probability that the check is good. The probability is compared to the merchant's risk profile, and appropriate authorization indicia is provided to the merchant.

With check "verification" the merchant uses the authorization indicia to decide whether to accept or reject the check. However, the merchant retains the risk of loss if the check turns out to be bad. In most cases, a merchant is charged a flat fee for each check verification.

With check "guarantee", the check acceptance service will actually buy the check from the merchant if an approved check turns out to be bad. This ensures that the merchant will not suffer a loss if it accepts a check that has been approved by the check acceptance service. In most cases, a merchant is charged a discount fee equal to a percentage of the value of each guaranteed check.

In the case of low risk transactions, which typically involve checks written for small amounts of money, the risk of loss may not justify the delay and communications costs associated with obtaining an on-line authorization indicia from the authorization host computer. Accordingly, a merchant may be able to reduce the costs and inconvenience by not requesting authorization indicia from the check acceptance service if a check is below a predetermined amount, or floor limit. In such cases, some check acceptance services provide check guarantee and require only that the merchant keep a log of the accepted checks that fall below the floor limit.

In order to obtain on-line check verification or guarantee from a check acceptance service, the merchant must be able to communicate the transaction data to the check acceptance service. Some merchants use a telephone to communicate with the check acceptance service via voice or dual tone multiple frequency (DTMF) tones. Other merchants employ electronic transaction terminals or cash registers that expedite the acquisition of data, and its transmission to the check acceptance service. For example, some merchants use check readers that electronically read a checking account number from the magnetic ink character recognition (MICR) signals printed at the bottom of a check. The check reader is usually connected to a separate terminal or cash register that allows the merchant to manually enter the purchase amount and the customer's drivers license number. In some states, drivers licenses include magnetic stripes that may be read electronically by a magnetic stripe reader associated with the separate terminal or cash register. In other cases, the drivers license number is entered into the terminal or cash register via the keypad.

In order to provide check verification or guarantee services to a merchant, the check acceptance service must receive various types of transaction data, including payment data, identification data, and merchant data. Payment data usually includes the checking account number, check sequence number, and the amount of the check. Identification data may include the customer's name, drivers license number, telephone number, etc. The merchant data is used by the check acceptance service to determine whether the merchant is an active client, and to identify the services provided to the merchant. Once the transaction data is collected at the point of sale, it is transmitted to the check acceptance service, along with merchant data.

After the transaction data is received from the merchant, the check acceptance service uses the available data to determine the likelihood that the check will be good or bad. This is typically accomplished by searching a database for negative information, such as outstanding bad checks, associated with the customer's account number or identification data (e.g., drivers license number). In addition, the check acceptance service will search its database for "positive" information accumulated from the check writer's earlier activity. All of this data is analyzed to determine the probability that the current check will be bad.

In most cases, the check acceptance service will be able to make a clear decision to decline or accept the check. In some cases, however, the check acceptance service may determine that additional information would be useful. If this is the case, the check acceptance service transmits a message to the merchant asking it to call a live operator via telephone and provide additional information, such as telephone number, mother's maiden name, etc.

Although the presently available systems are useful to provide authorization indicia, they include drawbacks that may decrease the merchant's ability to efficiently complete sales transactions. For example, if the merchant is asked to provide additional information to the check acceptance service, the merchant must personally call an operator associated with the check acceptance service and verbally provide the requested information. The operator then keys this data into a terminal connected to the authorization host computer, and provides a spoken authorization indicia to the merchant. This process, which typically takes approximately 2–5 minutes, is both inconvenient and time consuming, and results in additional delay to those waiting to complete the sale transaction.

In addition, the presently available systems provide no means by which a transaction terminal can perform "off-line" risk analysis at the point of sale without requiring communication with the check acceptance service's authorization host computer. With the present systems, checks for amounts below a predetermined floor limit are merely recorded. There is no way to evaluate the transaction data without the time and expense required to communicate with the host computer. Furthermore, current dial-up systems do not provide for electronically recording the transaction data associated with an off-line transaction, or for subsequently providing this data to the check acceptance service.

Furthermore, the present systems for authorizing check transactions do not provide an efficient way to collect customer and transaction data. The ability to collect transaction and customer identification data would allow the merchant to analyze the shopping habits of those customers that pay via check. Such data is extremely useful and valuable for marketing and other purposes.

For the foregoing reasons, there is a need in the art for an interactive method for providing additional transaction data using an electronic terminal, thereby eliminating the need to speak with a live operator. There is also a need for a transaction terminal that is capable of analyzing transactions, providing off-line approval codes without requiring communication with the authorization host computer, and storing terminal approved transactions until they are up-loaded to the authorization host computer. Furthermore, there is a need in the art for a convenient, efficient method for acquiring customer identification data.

SUMMARY OF THE INVENTION

The present invention is directed to a check acceptance system that satisfies these needs. A check acceptance system having the features of the present invention comprises an interactive check transaction terminal located at the point of sale and an authorization host computer system operated by a check acceptance service. The transaction terminal, which is operated by a merchant, and the authorization host computer communicate with each other via communications means and implement methods for providing interactive check authorizations, off-line terminal approvals, and for capturing customer name and address data.

Generally described, interactive check authorizations are provided by communicating a first transaction packet from the transaction terminal to the authorization host system. The first transaction packet includes information collected by the merchant at the point of sale. The authorization host computer analyzes the first transaction packet and determines whether to elicit additional information from the transaction terminal prior to completing the transaction. If additional information is desirable, the authorization host computer communicates a prompt to the transaction terminal. In response to the receipt of the prompt, the transaction terminal displays the prompt to the merchant, which enters the additional information into the terminal. The transaction terminal there communicates a second transaction packet, which contains the additional information, to the authorization host system. Based on the additional information, the authorization host computer then determines whether to authorize or decline the transaction, and communicates appropriate authorization indicia to the transaction terminal.

More particularly described, a transaction terminal implementing the method of the present invention obtains interactive authorizations by allowing transaction data to be entered into the transaction terminal at the point of sale. The transaction data is assembled into a first transaction packet, which is transmitted to the authorization host computer. The transaction terminal then receives a first response packet from the authorization host computer, and determines whether the first response packet includes a prompt signal. If the first response packet includes a prompt signal, a prompt corresponding to the prompt signal is displayed on a display associated with the transaction terminal. The transaction terminal receives additional data corresponding to the prompt, assembles a second transaction packet that includes the additional data, and transmits the second transaction packet to the authorization host computer. The transaction terminal then receives a second response packet from the authorization host computer, and utilizes an authorization indicia, which is contained in the second response packet.

In the present invention, transaction data is selected from the group that includes payment data, identification data, merchant data and product data. Some transaction data may be received via a keypad associated with the transaction terminal. Other types of transaction data may be received by electronically reading magnetic ink character recognition (MICR) data from a check, or by electronically reading identification data from a magnetic stripe on an identification card.

An authorization host computer implementing the method of the present invention provides interactive authorizations by receiving from the transaction terminal a first transaction packet, which includes transaction data associated with a pending transaction. The authorization host computer applies a risk scoring algorithm to at least a portion of the transaction data, which results in a first transaction score. If the first transaction score exceeds a predetermined approval value, the authorization host computer approves the transaction by transmitting an approval code to the transaction terminal. If the first transaction score falls below the predetermined approval value, the authorization host computer determines whether the transaction terminal is capable of interactive processing. If not, the authorization host computer can refer the transaction to a live agent or decline the transaction by transmitting an appropriate code to the transaction terminal. Preferably, the authorization host computer determines whether the transaction terminal is capable of interactive processing by examining an interactive processing indicia, which forms a part of the first transaction packet.

If the transaction terminal is capable of interactive processing, the authorization host computer transmits a request for additional information to the transaction terminal. The authorization host computer then receives a second transaction packet that includes the additional information, and applies the risk scoring algorithm to at least a portion of the additional information, which results in a second transaction score. If the second transaction score exceeds the predetermined approval value, the authorization host computer approves the transaction by transmitting an approval code to the transaction terminal. If the second transaction score falls below the predetermined approval value, the authorization host computer declines the transaction by transmitting a decline code to the transaction terminal.

Alternatively, an authorization host computer implementing the method of the present invention may receive the second transaction packet, which includes the additional information, and attempt to verify the transaction data using the additional information. If the transaction data is verified by the additional information, the authorization host computer approves the transaction by transmitting an approval code to the transaction terminal. If the transaction data is not verified by the additional information, the authorization host computer declines the transaction by transmitting a decline code to the transaction terminal.

In another aspect, the present invention provides an interactive point of sale transaction terminal. The terminal includes a display for prompting a merchant to enter transaction data into the terminal and a keypad for entering the transaction data into the terminal. The terminal also provides a magnetic ink character recognition (MICR) reader for reading check data from a check presented by a customer and a communication port for communicating the transaction data and the check data to an authorization host computer system. The terminal is controlled by a controller, which is operative for assembling a first transaction packet including transaction data, check data and an interactive processing indicia. The terminal transmits the first transaction packet to the authorization host computer, and receives a first response packet. The controller determines whether the first response packet includes a prompt signal. If the terminal prompts the merchant to enter additional data into the terminal by displaying a prompt corresponding to the prompt signal. The controller then assembles a second transaction packet that includes the additional data, and transmits the second transaction packet to the authorization host computer. Upon receipt of a second response packet from the authorization host computer, the terminal displays an authorization indicia, which is contained in the second response packet. To facilitate the collection of identification data, the terminal of the present invention may include a magnetic stripe reader for reading identification data from an identification card presented by the customer.

In yet another aspect, the present invention provides a check acceptance system for providing, storing, and up-loading off-line terminal authorizations. The invention provides a method for operating a transaction terminal to provide authorizations at the point of sale. Generally described, the transaction terminal receives transaction data that is entered into the transaction terminal at the point of sale. The transaction data is associated with a pending transaction being conducted at the point of sale. The terminal applies a terminal-based risk scoring algorithm to the transaction data in order to determine whether the pending transaction can be approved by the transaction terminal. If so, the terminal calculates and utilizes an approval code. The terminal stores an off-line transaction packet that includes at least a portion of the transaction data and the approval code.

If the terminal determines that it cannot approve the pending transaction, the terminal transmits a pending transaction packet, which includes the transaction data, to the remote authorization host computer for authorization. If the terminal also determines that it has previously stored at least one off-line transaction packet, the pending transaction packet will also include a flag indicating that the transaction terminal has stored off-line transaction packets for transmission to the remote authorization host computer.

In order to ensure that stored off-line transaction packets are up-loaded to the authorization host computer in a timely manner, the transaction terminal determines whether its memory includes more than a predetermined number of previously stored off-line transaction packets. If so, the terminal transmits a pending transaction packet to a remote authorization host computer for authorization. The pending transaction packet includes the transaction data and a flag indicating that the transaction terminal has stored off-line transaction packets waiting for transmission to the remote authorization host computer. The terminal then receives an authorization indicia from the remote authorization host computer and transmits the previously stored off-line transaction packets to the remote authorization host computer. Alternatively, the terminal determines whether the oldest previously stored off-line transaction has been stored for at least a predetermined period of time.

Still more particularly described, the transaction terminal includes predetermined risk assessment criteria and merchant identification information. The terminal receives transaction information corresponding to a pending transaction and applies the risk assessment criteria to the transaction information in order to determine whether the risk associated with the pending transaction is low, medium, or high. If the risk is low, the terminal authorizes the pending transaction by providing authorization indicia generated internally to the transaction terminal. If the risk is medium, the terminal attempts to communicate with the authorization host system via a communication means to obtain authorization indicia. If the risk is high, the terminal displays a prompt message on its display in order to prompt for entry of predetermined additional information associated with the pending transaction. The terminal receives the predetermined additional information, which is entered via a data entry means, and attempts to communicate with the authorization host system via the communication means to obtain authorization indicia.

The present invention provides a method for operating an authorization host computer to receive stored off-line transaction packets from the transaction terminal. Generally described, the authorization host computer receives a first transaction packet from the transaction terminal. The first transaction packet includes transaction data and a first flag indicating that the transaction terminal has a stored off-line transaction packet for transmission to the remote authorization host computer. The authorization host computer determines that the first transaction packet includes the first flag, and transmits a response packet, which includes an authorization indicia responsive to the transaction data and a second flag indicating that the remote authorization host computer is ready to receive the stored off-line transaction packet from the transaction terminal. The host computer than receives the off-line transaction packet from the transaction terminal and stores the data associated with the off-line transaction packet.

Still more particularly described, the present invention provides a method of operating a transaction system, which includes a transaction terminal and an authorization host computer. Transaction data is entered into a transaction terminal located at the point of sale. The terminal determines whether the pending transaction can be approved at the transaction terminal. If so, the terminal displays an approval indicia. The terminal then stores an off-line transaction packet that includes indicia of the transaction. If the terminal determines that the pending transaction cannot be approved at the transaction terminal, the terminal transmits a transaction packet to an authorization host computer for authorization. The transaction packet includes at least a portion of the transaction data and a first flag indicating that the transaction terminal has a previously stored off-line transaction packet for transmission to the remote authorization host computer. When the host computer receives the transaction packet from the terminal, it determines whether the transaction packet includes the first flag. If so, the host computer transmits an authorization indicia responsive to the transaction data and a second flag indicating readiness of the remote authorization host computer to receive the stored off-line transaction packet from the transaction terminal. The host computer receives and stores the off-line transaction packets.

In yet another aspect, the invention provides a method for processing transactions and collecting customer identification data at the point of sale. Generally described, a system that incorporates the features of the present invention will provide a point of sale transaction terminal that includes a payment form reader and an identification card reader. Payment data, which is associated with a payment form tendered by a customer in connection with a pending transaction, is obtained from the payment form reader. Customer identification data, which is associated with an identification card presented by the customer, is obtained from the identification card reader. The payment data and customer identification data are transmitted to an authorization host computer, which provides a response packet that includes authorization indicia for indicating whether the pending transaction is authorized or declined. The host computer also determines whether the customer identification data is already present in a data base associated with the authorization host computer. If not, the host computer stores at least a portion of the customer identification data in the data base. If the host computer already has the data, the customer identification data transmitted by the transaction terminal is discarded.

The payment data and the customer identification data may be transmitted to the authorization host computer in separate data packets. If so, and the host computer determines that the customer identification data is already present in the data base, the host computer transmits a response packet, which includes a flag indicating that the customer identification information is not needed. If the terminal receives a response packet containing the flag, the terminal terminates its transmission of the customer identification information.

Accordingly, it is an object of the present invention to provide a method of operating a check acceptance system to provide interactive authorizations.

It is another object of the present invention to provide an interactive transaction terminal.

It is another object of the present invention to provide a method for operating a transaction terminal to provide interactive data to an authorization host computer.

It is another object of the present invention to provide a method for operating a dial-up transaction terminal to provide interactive data to an authorization host computer.

It is another object of the present invention to provide a method for operating an authorization host computer to provide interactive authorizations.

It is another object of the present invention to provide a method of operating a check acceptance system to expedite the approval of low risk transactions by providing off-line approvals.

It is another object of the present invention to provide a method of operating a point of sale transaction terminal in order to provide off-line terminal approvals for pending transactions.

It is another object of the present invention to provide a method of operating a point of sale transaction terminal to store off-line transaction packets including transaction data and terminal generated approval codes.

It is another object of the present invention to provide a method for operating an authorization host computer for receiving and storing previously stored off-line transaction packets transmitted by a transaction terminal.

It is another object of the present invention to provide a method of operating a check acceptance system to facilitate the collection of customer identification data.

It is another object of the present invention to provide a method of operating a point of sale transaction terminal to facilitate the collection of customer identification data, and its transmission to an authorization host computer.

It is another object of the present invention to provide a method of operating an authorization host computer to efficiently receive customer identification data from a point of sale transaction terminal.

These and other objects, features, and advantages of the present invention may be more clearly understood and appreciated from a review of the following detailed description of the disclosed embodiments and by reference to the appended drawings and claims.

BRIEF DESCRIPTION OF THE DRAWINGS FIGURES

Figure 8A:
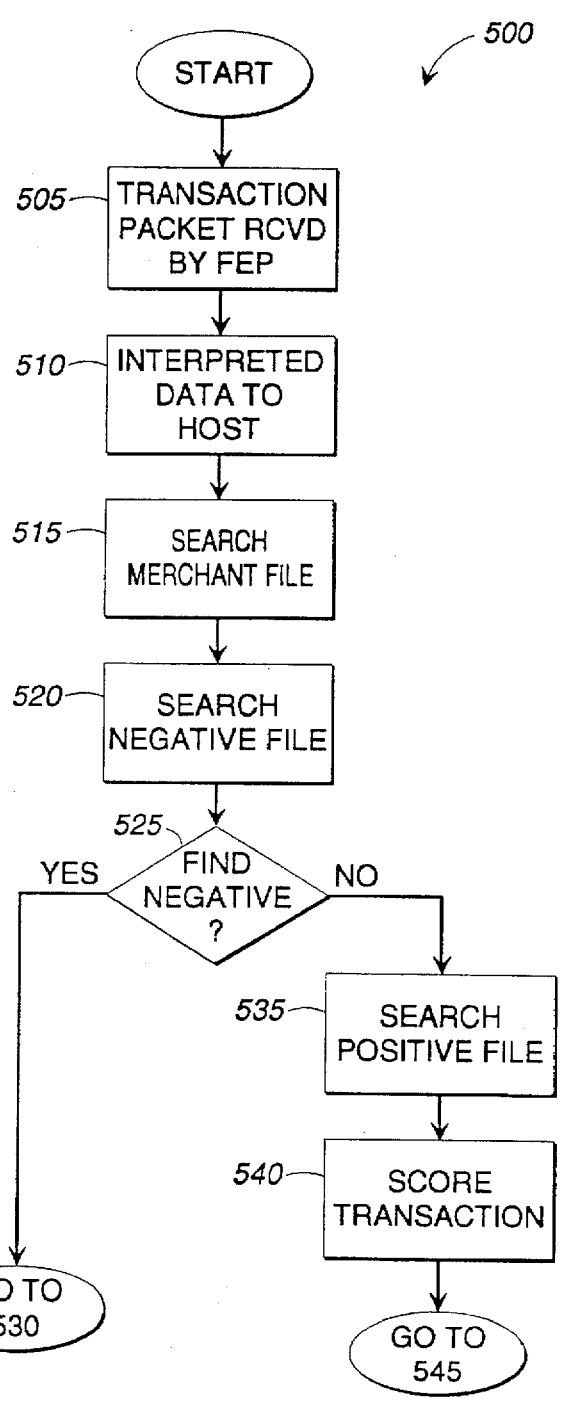
Figure 8B:
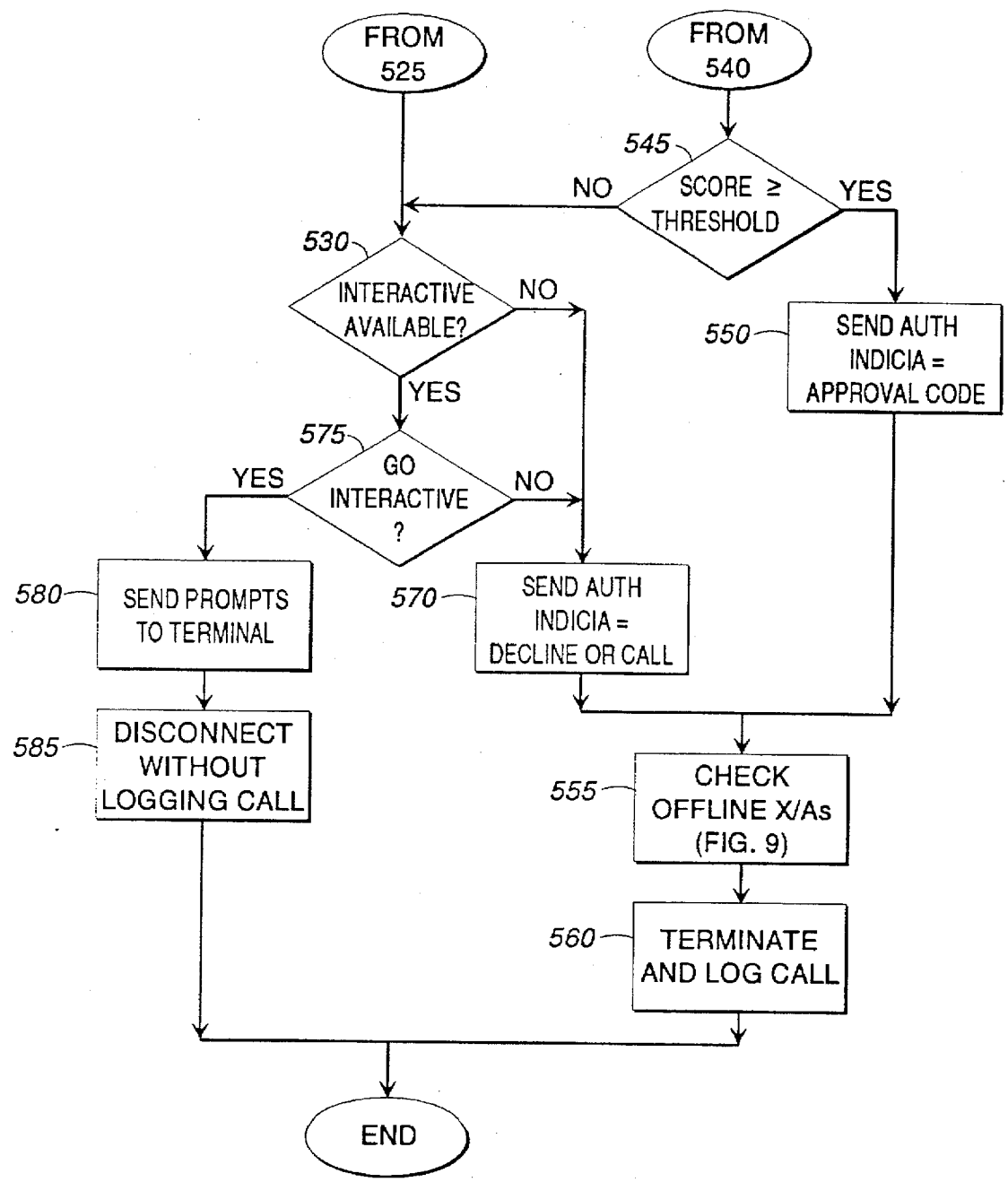

FIG. 8, consisting of FIGS. 8a and 8b, is a flow diagram illustrating the preferred method for operating an authorization host computer to receive data from and provide authorization indicia to an electronic check transaction terminal at the point of sale.

FIG. 9 is a flow diagram illustrating the preferred method for uploading stored off-line transactions from the electronic check transaction terminal to the authorization host computer.

FIG. 10 is a flow diagram illustrating an alternative method for capturing customer identification data, including name and address, and transmitting the data to the authorization host computer.

DETAILED DESCRIPTION OF THE PREFERRED EMBODIMENT

Turning now to the drawing figures, in which like numerals represent like elements throughout the several figures, a detailed description of the preferred embodiments will be provided.

Definitions

Before turning to the drawing figures, it is helpful to provide the following definitions:

A "check" refers to a draft or order for a certain sum of money payable on demand to a certain person named therein or to his order or to bearer. A check is drawn upon a bank or financial institution and purports to be drawn upon a deposit of funds available to the drawer. The face of a check typically includes the drawer's name and address and the name and location of the bank on which the check is drawn. In addition, checks include magnetic ink character recognition (MICR) characters that may be read electronically. The MICR characters typically include the drawer's account number, the drawee bank's transit number, and the check sequence number. In addition, the MICR characters may indicate whether the check is a company check or a personal check. The form or font of the MICR characters and their position along the bottom edge of the check are prescribed by ANSI standards X9.27-1988 and X9.13-1990, respectively, which are published by the American National Standards Institute, Inc., 1430 Broadway, New York, N.Y., and are incorporated herein by reference.

An "identification card" can mean a drivers license or other card bearing identifying information associated with a customer. The identifying information typically includes the customer's name and address, and may also include the customer's date of birth, social security number, drivers license number, other identifying numbers, gender, etc. Some states issue drivers licenses having magnetic stripes that provide all of the printed information in a magnetically encoded, electronically readable format. The characteristics of the magnetic stripe and the format of the data encoded thereon are prescribed by the "Specification for AAMVA ID/DL Magnetic Stripe," published by the American Association of Motor Vehicle Administrators, 4200 Wilson Boulevard, Suite 1100, Arlington Va., which is incorporated by reference and made a part hereof. A magnetic stripe include three tracks, which include the following data:

Track 1: State; City; Name; and Address.

Track 2: ANSI User Code; ANSI User ID; Jurisdiction ID/Drivers License No.; Expiration Date; and Birth Date.

Track 3: Template Version No.; Security Version No.; Postal Code; Class; Restrictions; Endorsements; Sex; Height; Weight; Hair Color; and Eye Color.

Those skilled in the art will appreciate that the magnetic stripe allows a merchant to obtain the identifying information from the identification card by swiping the drivers license through a suitable magnetic stripe reader.

A "data card" can mean a debit card, credit card, or other similar financial account card. Data cards typically include a magnetic stripe that provides, in electronically readable form, the account number, expiration date, cardholder's name and other information associated with the card. Data cards also provide a visible indication of an account number and other information in an area of embossed characters. The terms "data card," "credit card," and "debit card" are used interchangeably herein. The magnetic stripe and embossed characters are governed by ANSI standards X4.16-1983 and X4.13-1983, respectively, which are published by the American National Standards Institute, Inc., 1430 Broadway, New York, N.Y., and are incorporated herein by reference.

A "merchant" is an institution, such as a supplier of goods and/or services, that accepts checks from customers. The checks may be accepted as payment for goods and/or services provided by the merchant, or may be accepted and cashed as a convenience for the customer.

A "customer" or "check writer" is a person who purchases goods and/or services from a merchant, a person who attempts to cash a check at a merchant, or the drawer of a third party check presented to a merchant.

A "transaction" occurs when a merchant provides goods and/or services to a customer in exchange for some form of payment, which may include cash, checks, credit cards, debit cards, etc., or when a merchant cashes a check for a customer.

A "check acceptance service" is an institution that provides authorization indicia in response to various data provided by the merchant or otherwise available to the check acceptance service. The data may be used to search fields various data bases, as input into a scoring algorithm, or to validate other data. A check acceptance service may provide check verification and/or check guarantee services to merchants. With check verification, the merchant uses the authorization indicia provided by the check acceptance service to decide whether to accept or reject the check, but retains the risk of loss if the check turns out to be bad. With check guarantee, the check acceptance service buys the check from the merchant if an approved check turns out to be bad.

"Transaction data" is data associated with a transaction between a merchant and a customer. Transaction data includes various types of data, including payment data, identification data, merchant data, product data, and general data. Payment data may include check data, such as the MICR characters, check sequence number, check amount, and whether the check is a personal or company check. Payment data may also include the purchase amount, and the amount of cash, if any, that will be returned to the customer.

Identification data includes data such as the customer's name, address, drivers license number, social security number, telephone number, and mother's maiden name. Merchant data includes a merchant identification number assigned by the check acceptance service. Product data includes a product identification code. General or miscellaneous data includes data such as the date, time of day, day of week, etc.

A "risk scoring algorithm" is a predictive modeling system that analyzes a plurality of relevant variables in order to determine the probability of a particular check being good or bad. Credit risk scoring algorithms, which will be familiar to those skilled in the art, are developed to take into account those pieces of available data that have been determined to be statistically significant to a determination of the likelihood or probability that a particular check will be good or bad. This data may include the purchase amount, cash back amount, check number, time of day, day of week, type of goods purchased, etc. For each check presented, the risk scoring algorithm is capable of providing a transaction score, which is an individual rating that identifies that check's relative safety when compared to all other checks that have been evaluated. The transaction score is a normalized value that indicates the probability that the check will be good. The transaction score may be compared to the merchant's "score card," which includes predetermined values determined by the merchant and the check acceptance service, to determine whether the risk of loss is acceptable to the merchant. Although risk scoring algorithms are known in general, those skilled in the art will appreciate that the details of most algorithms, including the specific data considered and the weight given various data, are considered proprietary by their owners and, therefore, are treated as confidential business information.

"Authorization indicia" refers to predetermined messages and/or response codes provided by the authorization host computer or transaction terminal, indicative that a particular transaction has been approved or declined, or whether additional information is required. The authorization indicia may include codes such as an approval code, decline code, or a "call center" message. The authorization indicia may be electronic or audible.

An "on-line" authorization is one in which an authorization host computer provides an authorization indicia to a transaction terminal. An "off-line" authorization is one in which a transaction terminal provides an authorization indicia without requiring communications with an authorization host computer. A transaction terminal may establish an "on-line" mode of operation by initiating a communication session with an authorization host computer. For example, in a dial-up system, a terminal initiates a communication session by dialing a telephone number associated with the authorization host computer.

The Preferred Check Acceptance System

Figure 1:
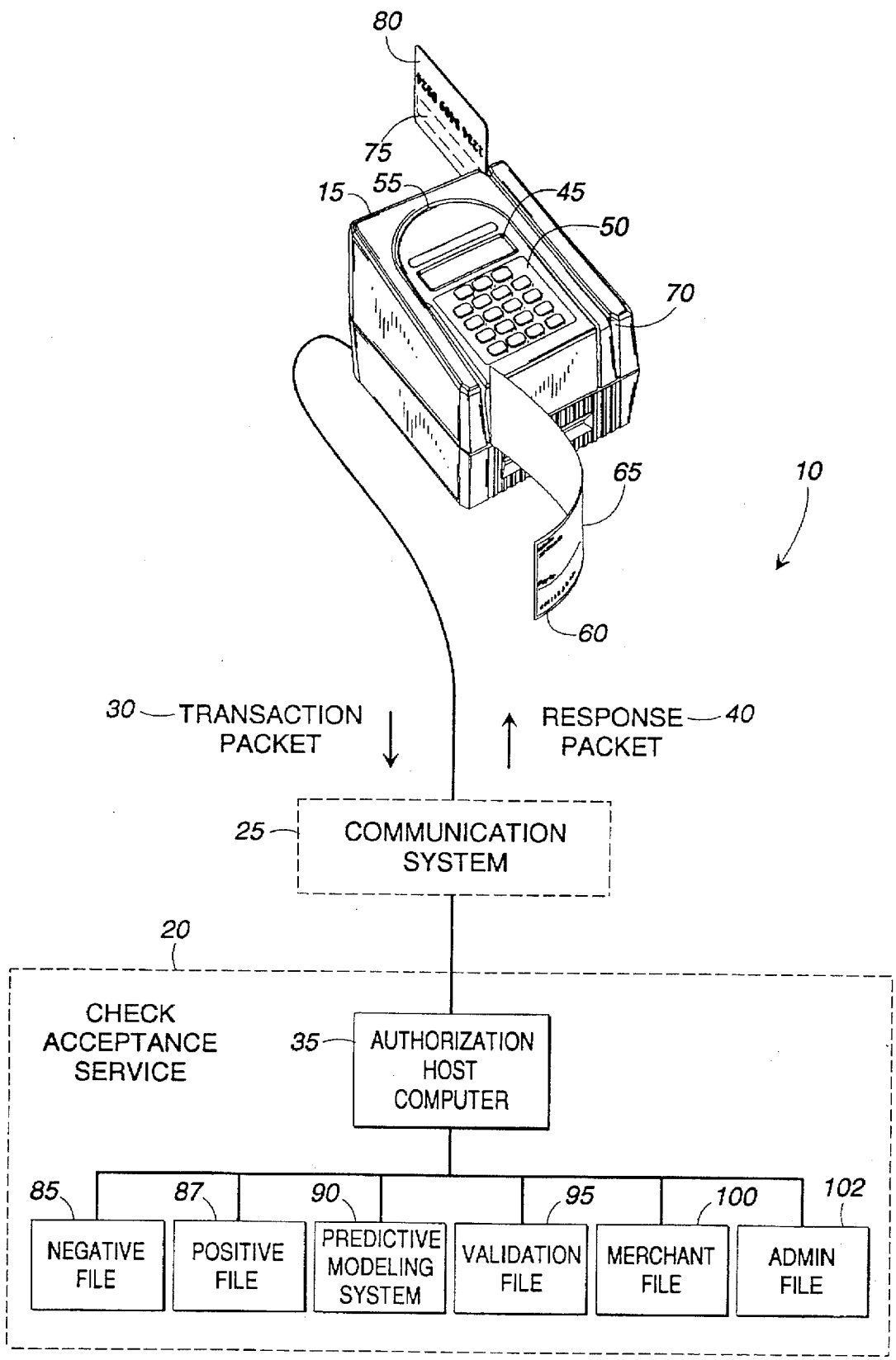
FIG. 1 is a diagrammatic illustration of a check acceptance system that employs an interactive electronic check transaction terminal for acquiring transaction data at the point of sale.

FIG. 1 illustrates the preferred check acceptance system 10, in which a merchant employs an interactive electronic transaction terminal 15 that communicates with a check acceptance service 20 via a communication system 25. Generally described, the merchant is responsible for entering the required transaction data into the transaction terminal 15. The transaction terminal 15 then attempts to connect to the check acceptance service 20 via the communication system 25. If the connection is established, the transaction terminal 15 transmits a transaction packet 30 to an authorization host computer 35, which is operated by the check acceptance service 20. The authorization host computer 35 processes the data in the transaction packet in the manner described below and returns a response packet 40 to the transaction terminal 15. The response packet 40 includes authorization indicia and other information. The authorization indicia, which indicates whether the check should be accepted or declined, or that additional information is needed, is displayed by the transaction terminal 15.

The preferred transaction terminal 15 includes a MICR reader, magnetic stripe reader, display 45, keypad 50, and a modem (not shown). The MICR reader includes a MICR read head (not shown) positioned adjacent a MICR slot 55, and is operative for electronically reading the MICR characters 60 on a check 65. The magnetic stripe reader includes a magnetic read head (not shown) positioned adjacent a card swipe slot 70, and is operative for electronically reading a magnetic stripe 75 on the back of a identification card 80 or data card (not shown). In a typical check transaction, the merchant inserts the check 65 into the MICR slot 55 and it is read by the MICR reader. The merchant then uses the terminal's keypad 50 to enter the amount of the check into the transaction terminal. If the terminal indicates that additional data is required, the merchant swipes the customer's identification card through the card swipe slot 70, or enters the appropriate identification data using the keypad 50. After all of the required data is entered into the transaction terminal, the terminal uses its internal modem to call the check acceptance service 20 and transmit the transaction packet 30 to the authorization host computer 35.

The transaction terminal 15 and authorization host computer 35 communicate with each other via the communication system 25. Those skilled in the art will understand that the preferred transaction terminal 15 is operative for automatically attempting to establish a communications link with the host computer 35 by dialing into a communications network provided by a major telecommunications provider such as AT&T, MCI, SPRINT, or the like. Although the preferred terminal 15 is intended to be used in conjunction with a dial-up transaction system, those skilled in the art will appreciate that the principles of the present invention may also be applied to other types of transaction systems, including those in which terminals are connected to an authorization host computer by a dedicated line or through a network embodying other data communications protocols.

The check acceptance service 20 includes the authorization host computer 3 5, and associated telecommunications equipment (not shown) that allows merchant's terminals to communicate with the authorization host computer. Those skilled in the art will understand that the associated telecommunications equipment includes call routing systems, front end processors, and other equipment needed to answer incoming calls, and route and format data included in incoming transaction packets.

Generally described, the primary function of the check acceptance service's authorization host computer 35 is to effectively differentiate between good and bad checks. To accomplish this, the preferred check acceptance service develops and maintains a variety of resources, including a negative data base 85, positive data base 87, and a sophisticated scoring algorithm or predictive modeling system 90. These resources are on-line, and are continuously updated to accept real-time check activity. The authorization host computer also has access to a validation file 95, which includes resources that may be used to validate information received from the check writer. Merchant related parameters are provided in a merchant file 100, and billing files and transaction logs are maintained in an administrative file 102.

The merchant file 100 includes data identifying each of the check acceptance service's merchant clients, and indicates the particular services that are provided to each merchant. Thus, when a transaction packet 30 is received by the authorization host computer 35, the computer checks the merchant data associated with the merchant identification number that was transmitted in the transaction packet. The merchant data indicates whether the merchant is an active client, and whether the merchant has contracted to receive verification or guarantee services. In addition, the merchant file includes merchant-specific acceptance parameters (or score cards) that are used by the predictive modeling system 90 to score the transaction and determine whether the transaction score, which indicates the probability that the check will be good, is within the parameters established by the merchant. The acceptance parameters may differ for various types of transactions, such as personal, payroll, government, or cash back. In addition, a merchant having multiple locations may choose different parameters for each location.

The host computer 35 then accesses the negative file 85, which contains bad check data that has been accumulated by the check acceptance service. This data may be accessed using the customer's checking account number, drivers license number, or other transaction data. The negative file 85 includes data indicating that previous checks tendered by the customer were returned for some reason, and have not be collected. If the customer's drivers license number or checking account is located in the negative file, the host computer will typically return an authorization indicia to the transaction terminal 15 indicating the check should be declined. In some cases, the authorization host computer will request additional transaction data from the merchant prior to declining the transaction. Data such as a current phone number, address, etc. may assist the check acceptance service if it is involved in efforts to collect the customer's previous bad checks.

If the negative file does not include bad check data associated with the customer, the authorization host computer 35 checks the positive file 87 in order to see whether the check acceptance service has any information pertaining to other checks written by the customer or on the drawer's checking account. Most of the data in the positive file is data that has been captured by the check acceptance service when it authorized or declined previous transactions by the same customer (as identified by drivers license number) or on the same checking account. For example, the positive file may include information indicating when and where previous checks have been written, the amounts of those checks, and other information regarding the type of merchant or product associated with each transaction. If the positive file includes information on the customer, this data is used in the risk scoring process, and the positive file will be updated to reflect the current transaction. If the positive file does not include any information on the check writer, the host computer will create a new record in the positive file using the information associated with the current transaction. As mentioned above, in the preferred check acceptance system, the authorization host computer's data base resources are continuously updated to accept real time check activity.

If the check has not been declined based on data from the negative file 85, the authorization host computer 35 will apply a credit risk scoring algorithm (represented by the predictive modeling system 90) to the available data in order to determine the likelihood or probability that the check will be good. The available data will include the data provided by the merchant and any positive file data retrieved by the host computer. In addition, the scoring algorithm may consider other variables, such as the time of day, the day of the week, merchant history, etc.

Credit risk scoring algorithms will be familiar to those skilled in the art. Such algorithms are developed to take into account those pieces of available data that have been determined to be statistically significant to a determination of the likelihood or probability that a particular check will be returned unpaid to the merchant. For each check presented, the risk scoring algorithm is capable of assigning a value that indicates that check's relative safety when compared to all other checks that have been evaluated. Although risk scoring algorithms are known in general, those skilled in the an will appreciate that the details of most algorithms, including the data considered and the weight given various data, are considered proprietary by their owners and, therefore, are treated as confidential business information.

The result of the scoring algorithm is a normalized transaction score that indicates the probability that the check will be good. The transaction score is compared to predetermined values determined by the merchant and the check acceptance service to assess whether the risk of loss is acceptable to the merchant. By working with the merchants, the check acceptance service is able to vary risk levels to accommodate the needs of a particular merchant. In some cases, the score may be too low to authorize the transaction, but not low enough to reject out of hand. In that case, the host computer 35 may request additional information from the merchant and re-score the transaction using all of the information available.

In some cases, the authorization host computer will attempt to validate the data provided prior to authorizing the transaction. This is accomplished using the validation file 95. The validation file 95 includes data that has little or no statistical significance in terms of determining the likelihood that a check will be bad. However, the validation file 95 includes other information that may be indicative that the customer is who he or she claims to be, and that the check will be collectable. For example, the check acceptance service may ask the merchant to provide the customer's home telephone number and attempt to verify that the number is billable. This may be accomplished by checking files available from the telephone companies. In addition, the customer's mother's maiden name and state drivers license records, if available, may be used to confirm data provided by the customer. In addition, it may be desirable to be able to confirm the status of the customer's checking account, such as whether the account is a new account, whether it is overdrawn, closed for cause, etc.

After the authorization host computer 35 performs the steps described generally above, the authorization host computer provides an authorization indicia to the merchant. The authorization indicia may indicate that the check was declined based on negative data associated with the check writer or the checking account. Alternatively, the authorization indicia may indicate that the transaction was declined because the normalized score fell below the merchant's predetermined cutoff point. If the transaction was approved, the authorization indicia will provide a transaction-specific multi-digit approval code that is recorded on the check by the merchant, along with the merchant's identification number. The approval code and merchant identification number may be written by hand, or printed using a suitable printing device. When the transaction is completed, the call is logged in the administrative file 102 for billing and transaction record keeping purposes.

The Preferred Transaction Terminal

Figure 2:
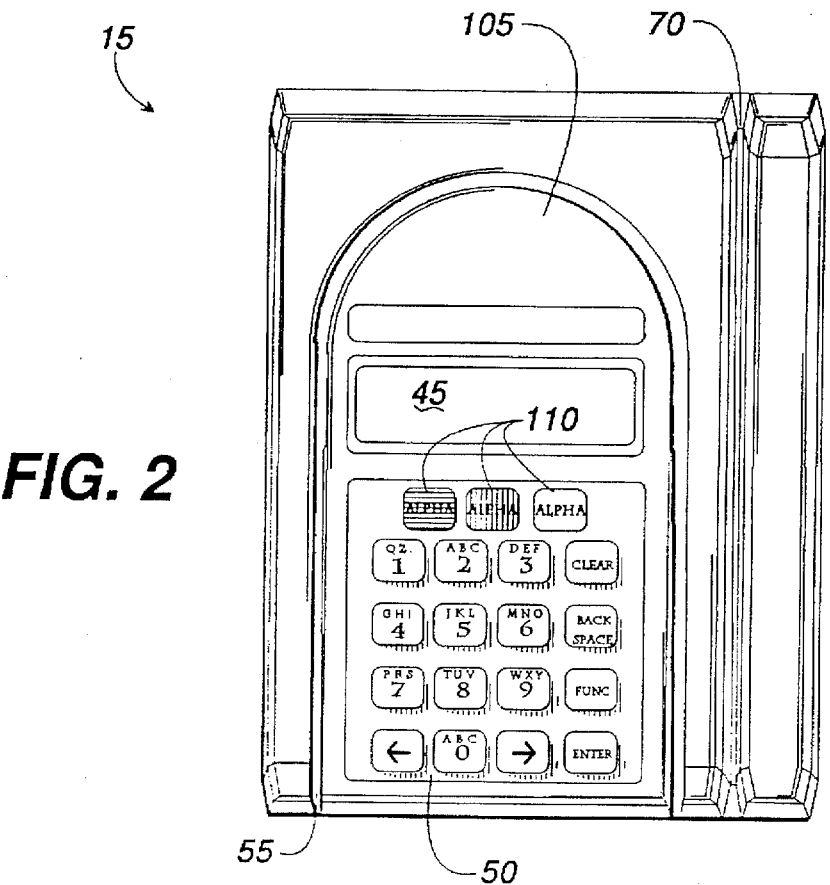
FIG. 2 is a top plan view of an interactive electronic check transaction terminal suitable for use in the check acceptance system of FIG. 1.
Figure 3:
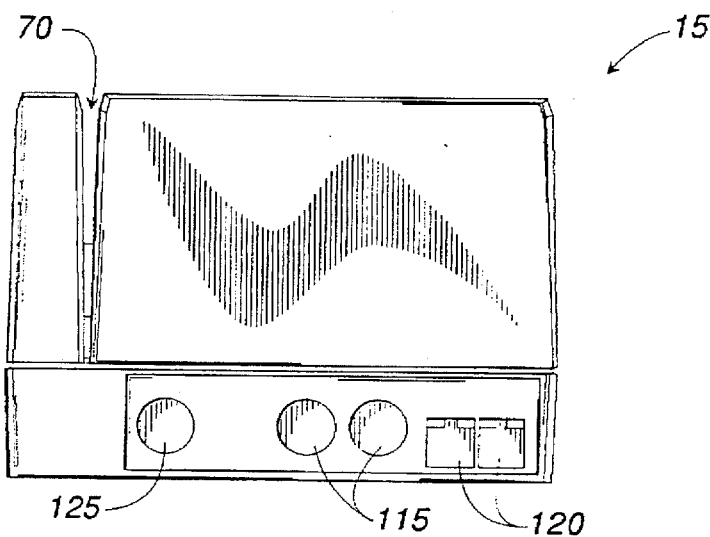
FIG. 3 is a rear view of the interactive electronic check transaction terminal of FIG. 2.
Figure 4:
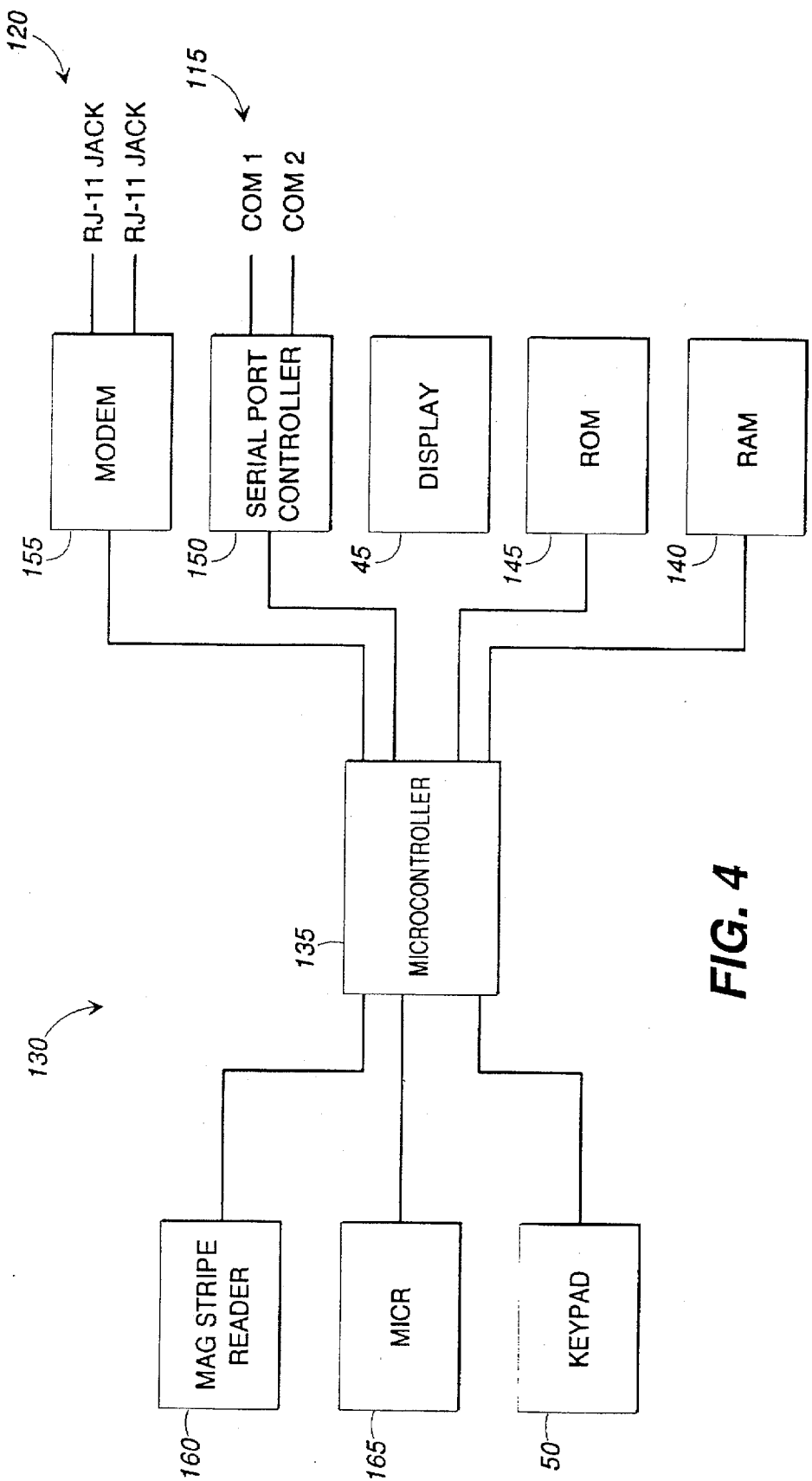
FIG. 4 is a block diagrammatic representation of the electronic circuitry employed in the interactive electronic check transaction terminal of FIG. 2.

Turning now to FIGS. 2–4, additional details of the preferred transaction terminal 15 will be provided. The preferred transaction terminal 15 is a slightly modified version of the terminal described in pending U.S. patent application Ser. No. 07/115,976, entitled "Standalone Check Transaction Terminal," filed Jul. 28, 1993, the disclosure of which is incorporated herein by reference. Therefore, additional details regarding various aspects of the construction and operation of the preferred transaction terminal 15 may be found in the Standalone Check Transaction Terminal application.

FIG. 2 is a top plan view of the preferred transaction terminal 15, and illustrates the relative positions of the display 45, keypad 50, MICR slot 55, and card swipe slot 70. The close proximity of the components allows the preferred transaction terminal 15 to provide a check reader, magnetic stripe reader, keypad and display in a single device having a compact footprint. A top cover 105 houses the display 45 and keypad 51), and conceals the MICR reader. The cover 105 also forms the MICR slot 55 that guides the check 65 through the MICR reader. When the check 65 is inserted into MICR slot 55, a motorized drive mechanism drives the check past the MICR read head (not shown), which reads the account number from the check's magnetic ink characters 60. The magnetic stripe reader is capable of reading data from magnetic stripes on identification cards and data cards. The magnetic stripe reader comprises a read head (not shown) and a card swipe slot 70. The read head is positioned inside the transaction terminal so that it is adjacent the magnetic stripe as the identification card 21) is swiped through the card swipe slot 70.

The keypad 50 includes 19 keys. In addition to numeric keys (including alphabetic characters), the keypad includes two scroll keys—a left-arrow (←) and right arrow (→) — that allow displayed data to be scrolled left or right, respectively. A CLEAR, BACKSPACE and ENTER keys are used to allow the merchant to clear, move back a space, and enter alphanumeric data and commands into the transaction terminal, respectively. A FUNC (function) key allows the merchant to carry out various administrative functions that may be performed by the transaction terminal. Three alphabetic or "alpha" keys 110 are provided for alphabetic data entry.

In order to allow a merchant to manually enter identification information associated with a check transaction, it is necessary for the keypad to allow the entry of alphanumeric characters. Such characters frequently appear in driver's license numbers. Various schemes for alphabetic data entry utilizing a numeric keypad, such as a telephone keypad, are known in the art. The present invention utilizes an alphabetic data entry method that is described in the above-referenced Standalone Check Transaction Terminal application. Alpha characters are selected and entered by using a two key sequence in which one key indicates the selection of a group of three characters and the other key indicates the positional placement of a selected alphabetic character within the indicated group.

An alphabetic data entry scheme employing a two key sequence may be implemented so that the positional placement indicating key is entered first. In this implementation, the "placement division" or positional location of the desired character within a group of characters is indicated by pressing one of the three "alpha" keys 110 at the top of the keypad 50. These keys allow the merchant to indicate whether the desired alpha character is the left, center, or right character inscribed above the numerals on the numeric keys. After the placement division is indicated, the merchant presses the key bearing the desired alpha character. The operation of the keypad is illustrated in the following table:

| Desired Character | Key sequence |
| --- | --- |
| a | left "alpha" - 2 |
| e | center "alpha" - 3 |
| i | right "alpha" - 4 |
| o | right "alpha" - 6 |
| u | center "alpha" - 8 |

In the preferred transaction terminal 15, the alpha keys 110 and the alpha characters on the numeric keys are color coded. The color of each alpha key corresponds to the color of one of the alpha characters inscribed on each numeric key. For example, the left alpha key 110 is blue, while each of the leftmost alphabetic characters on each of the numeric keys on the keypad 50 is blue. In like manner, the center alpha key 110 is colored red, while each of the of the center alphabetic characters on each of the numeric keys is red. Finally, in like manner, the rightmost alpha key 110 is colored green, while each of the of the rightmost alphabetic characters on each of the numeric keys is green.

As described in connection with FIG. 4, signals from the keypad 50 are connected to a microcontroller, which is operative to detect the depression of a key on the keypad and perform an appropriate action in response thereto. It should be noted that the signals from the keypad comprises row and column identifier signals, so that depression of any particular key on the keypad can be identified by the microcontroller. Even though the keypad bears some resemblance to a standard telephone keypad, unlike a standard telephone keypad the keys are not connected to a dual tone multiple frequency (DTMF) generator. Rather, depression of a key is detected by the microcontroller, which is operative to translate the row and column signals to determine which key was depressed, and take appropriate action in response thereto. For example, depression of the left (blue) alpha key, followed by the "2" key, results in selection of the alphabetic character "a," which is displayed on the LCD 45, and an eight-bit ASCII character corresponding to the letter "a" is stored in memory of the terminal in a corresponding memory location associated with other data entered by the keypad.

FIG. 3 is a rear view of the preferred transaction terminal 15. The transaction terminal 15 provides, on its exterior housing, a plurality of communications ports for providing data communications between the transaction terminal 15, other serial point of sale ("POS") devices (not shown), and a remote check acceptance service. The transaction terminal 15 includes two serial ports 115 and two RJ-11 telephone jacks 120. The serial ports 115 are 6-pin mini-DIN connectors. The serial ports are bi-directional and are operative to allow the transaction terminal to communicate with other serial devices, such as receipt printers, personal identification number ("PIN") pads, signature capture pads, etc. The R J-11 telephone jacks 120 are operative in the manner described below to connect the transaction terminal to a telephone line, thereby allowing the transaction terminal 15 to communicate with the remote check acceptance service. The transaction terminal 15 also includes a 3-pin mini-DIN power supply connector 125, which receives power from an external power supply.

FIG. 4 is a block diagram of the electronic control circuitry 130 employed in the preferred check transaction terminal 15. The preferred circuitry 130 is constructed around a type 80C31 8-bit microcontroller 135 manufactured by Intel Corporation, Santa Clara, California. Details of the preferred microcontroller are available in the literature supplied by the manufacturer. The circuit 130 includes random access memory ("RAM") 140 and read only memory ("ROM") 145, which provide volatile and non-volatile storage for the microcontroller 135. The preferred RAM includes 256K bytes of battery backed RAM for storage of transaction data and any downloadable application program(s). The preferred ROM is a 16K byte ROM for storing the terminal's firmware. The firmware is operative for providing low level hardware specific features. In addition, the firmware includes a bootstrap load utility capable of downloading the application program via modem or serial port.

The microcontroller 135 is connected to an external serial port controller 150. The preferred serial port controller is a type 82C452 serial communications controller, manufactured by Startech Semiconductor, San Jose, Calif., which includes two individually programmable serial ports 115 that may used to communicate with a variety external serial devices. Typical serial devices found in point of sale systems include receipt printers, signature capture pads, PIN pads, or other peripheral devices.

In addition to the serial ports 115, the transaction terminal 15 includes a 1200 baud modem 155, which is connected to two RJ-11 telephone jacks 120. The preferred modem 155 is a type 73K212 modem, manufactured by Silicon Systems, and is operative for sending and receiving data between the transaction terminal 15 and remote data communications devices connected via a standard telephone line. The remote data communications devices may be operative for receiving transaction data associated with check transactions being conducted at the transaction terminal, and providing authorization indicia associated with those transactions. In addition, these remote devices may provide the transaction terminal's application program, which may be downloaded from time to time as described below. The preferred data transmission characteristics are:

| Characteristic | Description |
| --- | --- |
| Speed | 1200 bits per second (baud) |
| Transmission | full duplex asynchronous |
| Start bits | 1 |
| Stop bits | 1 |
| Character Size | 8 bits |
| Transmission sequence | least significant bit first |
| Parity | none |
| Parity Bit Position | most significant bit |

Those skilled in the art will understand that the format of the transaction data packets is determined by the check acceptance service that is providing check related services to the merchant.

Still referring to FIG. 4, the magnetic stripe reader 160 is connected to the microcontroller 135 and includes the magnetic read head and additional analog circuitry required to buffer and amplify the signals received from the read head. Those skilled in the art will understand that the data cards having magnetic stripes commonly in use today include three data tracks, denominated tracks 1, 2, and 3. For example, some states provide driver's licenses that have magnetic stripes with identification data recorded on tracks 1, 2, and/or 3.

In the preferred transaction terminal 15, the read head is operative to simultaneously read data recorded on tracks 1 and 2 of a card's magnetic stripe. The data from each track is buffered and is provided to the microcontroller 135, where it is decoded in a manner known to those skilled in the art. A suitable method of decoding such data is described in copending U.S. patent application Ser. No. 07/790,658, filed Nov. 8, 1991, entitled "Card Transaction Terminal," the disclosure of which is incorporated herein by reference and made a part hereof. After the magnetic stripe data is decoded by the microcontroller, the data is used by the transaction terminal in the manner described below The MICR reader 165 is connected to the microcontroller 135 and includes analog and digital circuitry required to control the MICR reader and decode the data read from the check. In addition to data signals from the MICR read head, the microcontroller 135 also receives signals from sensors that are associated with the preferred MICR reader and indicate the presence and approximate position of a check that is to be read. In response to these signals, the microcontroller sends signals that control the MICR motor and cause the check to be carried past the MICR read head. Signals from the magnetic ink characters on a check are picked up by a MICR read head. These signals, which are indicative of the account data imprinted on the check, are provided to the microcontroller 135, where the data is decoded and used in the manner described below. In addition, the circuitry associated with the MICR read head also provides a signal indicative of the strength of the magnetic ink used to form the MICR characters. The signal strength may be used to derive a "confidence level" that the check is genuine. Suitable circuitry for controlling the MICR motor and receiving signals from the MICR read head may be obtained from Mag-Tek, Inc., Carson, Calif., the manufacturer of the preferred check reader 165.

The microcontroller 135 is also connected to a keypad 50 and display 45. The preferred keypad is described above in conjunction with FIG. 2, and allows the user to enter transaction data and terminal commands. The preferred display is a 45 is a 2 line by 16 character liquid crystal display, type UC 16217GNAR, manufactured by Samtron-Samsung Electron Devices, La Mirada, California. The display is operative in the manner known to those skilled in the art for displaying instructions to the merchant and to display transaction data as it is entered into the transaction terminal.

The Preferred Method of Authorizing Check Transactions

Figure 5:
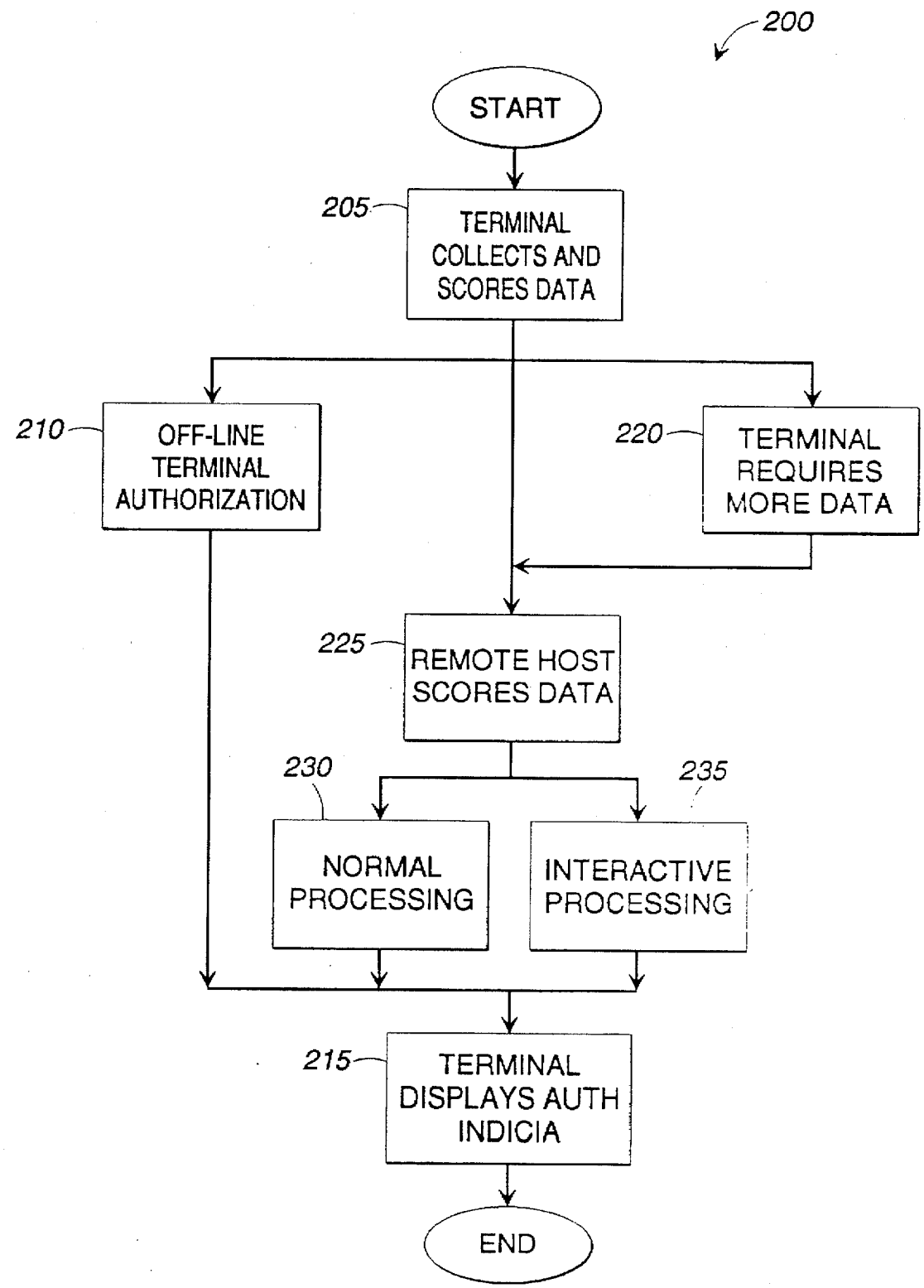
FIG. 5 is a general flow diagram illustrating the preferred method of authorizing check transactions.

FIG. 5 is a flow diagram illustrating the preferred method 200 of authorizing check transactions using the check acceptance system of FIG. 1. The flow chart of FIG. 5 is intended to illustrate the general flow of a check transaction and depicts the principal processes, regardless of whether they are carried out by the transaction terminal 15 or the authorization host computer 35. More detailed flow diagrams illustrating the methods executed by the transaction terminal and authorization host computer are provided in FIGS. 6 and 8, respectively.

The preferred method 200 begins at step 205 where the transaction data is entered into the preferred transaction terminal 15. A distinct advantage of the present invention is that the transaction terminal applies a terminal-based risk scoring algorithm to the available transaction data in order to determine how the transaction should be processed. Based on the outcome of the scoring algorithm, the transaction terminal will choose one of three options. If the risk of loss is sufficiently low, the transaction terminal will approve the transaction and store the transaction data without communicating with the host computer. If the risk of loss falls in a middle or medium range, the transaction terminal will initiate communication with the authorization host computer and send the accumulated information to the authorization host computer for authorization. If the risk of loss is sufficiently high, the transaction terminal request additional information from the merchant prior to sending all of the accumulated data to the authorization host computer for authorization.

The terminal based risk scoring algorithm allows the transaction terminal to assess the risk of loss associated with a check by analyzing a variety of variables. Examples of variables that may be entered into the transaction terminal, and available to the scoring algorithm, include the check sequence number, purchase amount, cash back amount, etc., and whether the check is a personal or company check. The terminal may also provide data indicating the time of day, day of week, and the strength of the MICR characters. Those skilled in the art may be familiar with other variables that are available to the transaction terminal. The scoring algorithm is designed to consider a predetermined group of the available variables and apply predetermined weights to those variables in order to assess the risk associated with the check.

If the transaction terminal determines that the transaction is a "low risk" transaction, the method 200 proceeds to step 210, where the terminal provides an "off-line" approval. The approval is off-line because the approval code is generated by the transaction terminal without any communication between the terminal and the authorization host computer. This allows the terminal to display an authorization indicia almost instantaneously, and significantly decreases the amount of time required to complete the transaction. The terminal-generated authorization indicia consists of an approval code, which is stored with the transaction data until it is up-loaded to the authorization host computer. In the preferred system, the stored off-line transactions are up-loaded to the authorization host computer when the terminal is communicating with the authorization host computer for the purpose of authorizing a subsequent transaction. After the data is stored by the terminal, the method proceeds to step 215 and the authorization indicia is displayed for the merchant.

If, at step 205, If the transaction terminal determines that the transaction is a "high risk" transaction, the method proceeds to step 220, where the terminal prompts the merchant to enter additional transaction data. Factors that may be particularly relevant to a decision to request additional transaction data include the amount of the check, and whether the customer is receiving cash back. The additional data requested at this step is determined by flags or variables set within the terminal, and may includes data such as drivers license number, phone number, product code, etc. After this data is entered into the terminal, the method proceeds to step 225.

If, at step 205, the transaction terminal determines that the transaction is a "medium risk" transaction, the method proceeds to step 225.

At step 225, the transaction terminal transmits the accumulated transaction data to the authorization host computer for the purpose of authorizing the proposed check transaction. The authorization host computer applies a sophisticated scoring algorithm to the data in order to determine whether the check should be approved. If the outcome of the scoring process is determinative, the method proceeds to step 230. If not, the method proceeds to step 235 and requests additional information from the merchant by employing the interactive features provided by the preferred transaction terminal 15.

At step 230, the authorization host computer transmits an authorization indicia to the transaction terminal. If the transaction is approved, the authorization indicia will include a transaction-specific approval code. If the transaction is declined, the authorization indicia will indicate whether the check is declined because of negative data on the check writer, or because the result of the scoring process fell below the merchant's predetermined threshold. From step 230, the method proceeds to step 215, where the terminal displays the authorization indicia to the merchant.

At step 235, the authorization host computer initiates an interactive process, which provides a distinct advantage over prior art systems and methods. The authorization host computer initiates the interactive process by selecting and transmitting the appropriate prompts to the transaction terminal. The telephone connection between the authorization host computer and the terminal is then disconnected to reduce communications costs. The transaction terminal displays the prompts and the merchant enters the requested data in response to the prompts. After all of the requested data is entered, the terminal re-initiates communications with the authorization host computer, and transmits all of the transaction data to the authorization host computer. The authorization host computer the applies the risk scoring algorithm to all of the data and determines whether to approve or decline the check. The appropriate authorization indicia is transmitted to the terminal, and is displayed for the merchant at step 215.

Those skilled in the art will understand that in the preferred system, the transaction terminal and authorization host computer each applies it own risk scoring algorithm to the transaction data. While the terminal risk scoring algorithm can only be applied to transaction specific variables available at the terminal, the authorization host computer may apply its scoring algorithm to transaction specific data, and to data included in the check acceptance service's positive file. This allows the authorization host computer to consider variables such as other checks that have written by the customer.

As technological changes bring increased computing power to the terminal, it may be desirable to provide additional data or apply more complex scoring algorithms at the transaction terminal. Likewise, the risk scoring algorithms may implement conventional processing algorithms or complex neural networks. However, those skilled in the art will understand that the present inventions provides for various types of risk scoring algorithms to be applied by both the transaction terminal and the authorization host computer without regard to the complexity or nature of the algorithms, or the availability of additional data.

The Preferred Method of Operating the Transaction Terminal

Figure 6:
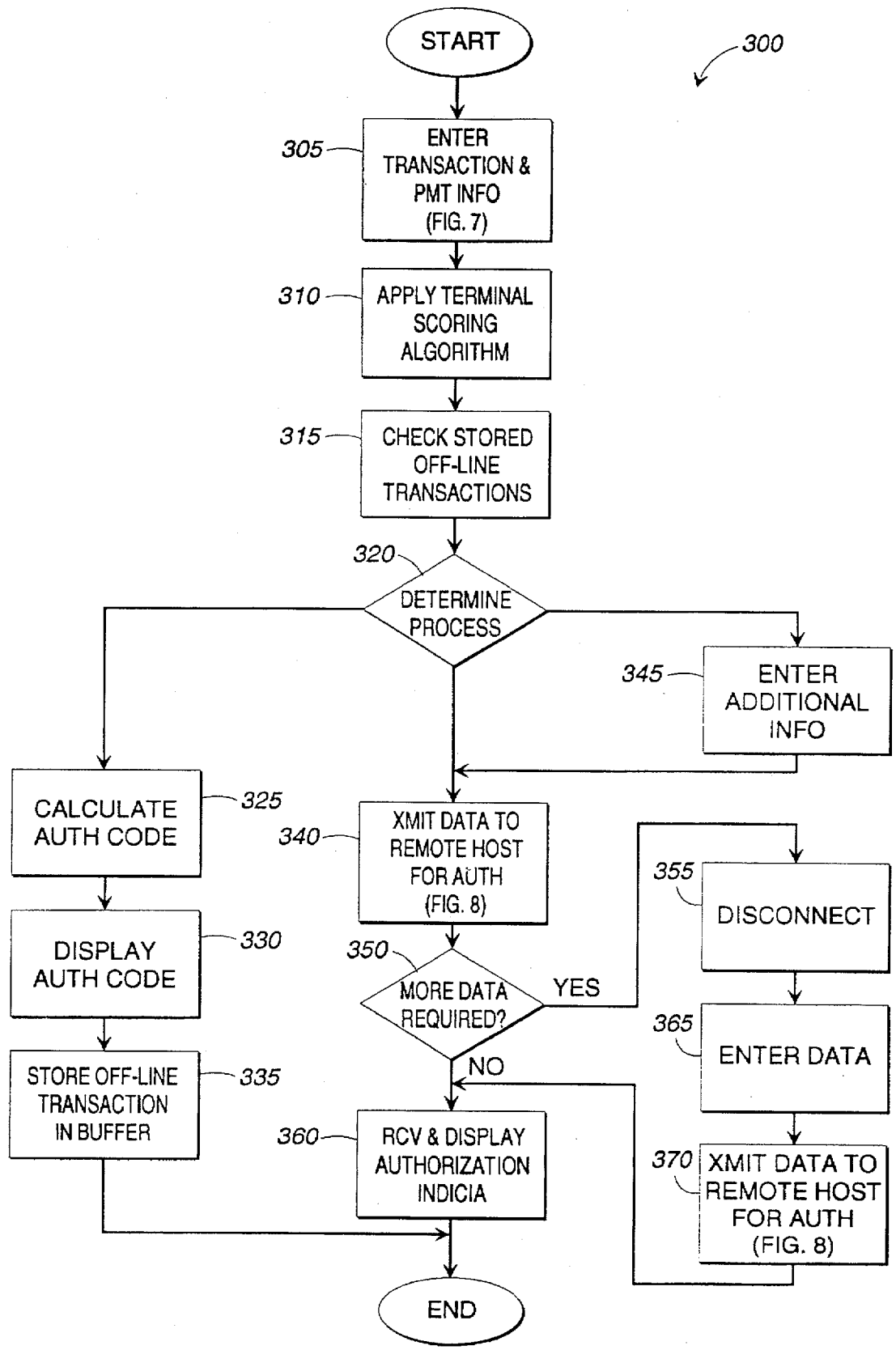
FIG. 6 is a flow diagram illustrating the preferred method of operation for the electronic check transaction terminal of FIG. 2.

FIG. 6 is a flow diagram illustrating the preferred method 300 of operating the transaction terminal 15 in the check acceptance system of FIG. 1. Those skilled in the art will understand that the preferred method 300 is implemented as program code for the transaction terminal's microcontroller.

Generally described, the method 300 controls the acquisition of transaction data at the point of sale and the transmission of data between the transaction terminal 15 and the authorization host computer 35. The method 300 requires that the merchant enter transaction data into the transaction terminal. The terminal then analyzes this data using a terminal-based scoring algorithm. Based on the outcome of the terminal scoring algorithm, the transaction terminal will either approve the transaction "off-line" without transmitting data to the authorization host computer, transmit the data to the authorization host computer for authorization, or request additional information from the merchant prior to transmitting the data to the authorization host computer. In the preferred method 300, the transaction terminal will not decline the transaction based on the outcome of the terminal scoring algorithm. After the authorization process is complete, the transaction terminal will display an appropriate authorization indicia to indicate to the merchant whether the check should be accepted or declined.

The preferred method begins at step 305 by prompting the merchant to enter transaction data into the terminal. At this step, the merchant would enter the check's MICR numbers by inserting the check in the MICR reader, or by manually entering the characters via the keypad. If the MICR numbers are entered manually, the merchant will also indicate the check sequence number and whether the check is a personal check or a company check. The merchant will also enter be prompted to enter the amount of the check and indicate the amount of cash, if any, that will be given to the customer. At this step, the transaction terminal may also prompt the merchant to swipe the customer's drivers license through the card swipe slot. The process by which transaction data is entered is described more completely below in conjunction with FIG. 7. The transaction data is stored in the terminal so that it is available for subsequent transaction packets as described below in relation to interactive processing.

At step 310, the terminal applies a terminal-based risk scoring algorithm to the available transaction data to determine whether the transaction should be processed locally or remotely, and whether additional information is required. The terminal scoring algorithm, which is based on the principles of the authorization host computer's credit scoring algorithm, analyzes the available data to determine the probability that the check will be good. Those skilled in the art will understand that the terminal scoring algorithm may analyze any of the statistically significant data available at the terminal. Such data may include, but is not limited to, the check sequence number, the amount of the purchase, the amount of cash back, the time of day, whether the check is a personal or company check, and the strength of the MICR read. Those skilled in the art will understand that the terminal based algorithm may be as simple as determining whether the purchase amount is greater than or less than predetermined amounts, or floor limits. Alternatively, the algorithm may be sophisticated enough to consider a plurality of the available data. As mentioned earlier, the particular data and the weights assigned to various data are considered proprietary by their owners, and are not generally known. However, the relevant principles will be familiar to those skilled in the art.

Depending on the outcome of the terminal scoring algorithm, the method 300 chooses one of three branches. If the terminal scoring algorithm determines that the risk associated with the check falls in an average or middle range, the terminal will transmit the transaction data to the authorization host computer and await a response. If the terminal scoring algorithm determines that the risk associated with the check is sufficiently low, the terminal will approve the transaction and provide an approval code without initiating on-line communications with the authorization host computer. In the case of an off-line approval, the transaction data will be stored in the terminal until the terminal communicates with the authorization host computer for the purpose of approving a subsequent check transaction. If the terminal scoring algorithm determines that the risk associated with the check is sufficiently high, the terminal will require the merchant to enter additional information into the terminal prior to transmitting the transaction data to the authorization host computer. Although some transactions may be approved off-line by the terminal, the preferred method 300 does not permit the transaction terminal to decline a transaction based on the outcome of the terminal scoring algorithm.

After the terminal scoring algorithm is applied at step 310, the method proceeds to step 315, where the terminal checks to see whether any previous off-line transactions are stored in its buffer. If stored off-line transactions are present, the terminal determines the number of stored transactions, and the date and time of the oldest stored transaction.

At step 320, the method 300 uses the results of step 315 and step 320 to determine how to process the current transaction. If the outcome of the terminal scoring algorithm indicated that the current transaction can be approved by the terminal, the method will determine whether there are a predetermined number of off-line transactions stored in the buffer, or that the oldest stored off-line transactions is older than a predetermined time period. If so, the current transaction will be transmitted to the authorization host computer for authorization, with a flag set indicating the presence of stored transactions. This results in the stored off-line transactions being uploaded to the authorization host computer. In the preferred terminal, the current transaction will be processed remotely and the off-line transactions uploaded if there are 25 stored off-line transactions, or if the oldest transaction is more than 24 hours old. The transaction number and time limit are variable and selected to ensure that off-line transaction data is up-loaded to the host computer and used to update the check acceptance service's data bases within a reasonable period of time. If, as a result of the terminal scoring algorithm, the current transaction is to be transmitted to the authorization host computer for authorization, the transaction packet will include a flag indicating that the terminal has stored off-line transactions in its buffer without regard to the number or age of the stored transactions.

If the terminal scoring algorithm determined that the current transaction can be approved by the terminal, and the stored off-line transactions do not exceed the predetermined quantity or age, the method proceeds to step 325. At step 325, the calculates an off-line approval code. Those skilled in the art will appreciate that a transaction specific approval code may be calculated by using various data, such as amount, merchant identification number, time of day, date, etc. This allows the terminal to provide an approval code that may not be easily derived by a merchant. At step 330, the terminal displays the off-line approval code on its display. In most cases, the approval code will be recorded on the check by the merchant.

After the off-line approval code is displayed at step 330, the method 300 proceeds to step 335, where the terminal stores an off-line transaction packet, which includes the off-line transaction data and the off-line approval code. The off-line transaction packets will be stored in the terminal until such time as they are up-loaded to the authorization host computer. The off-line transaction packets are up-loaded in order to provide a complete detailed record of the merchant's check transactions for the purposes of tracking the activity of the check writer, billing the merchant, and to satisfy any legal requirements imposed on the merchant or check acceptance service. In the preferred system, the transaction terminal will store off-line transaction packets until a remote authorization provides communication with the host computer, until a predetermined number of off-line authorizations has been stored, or until the oldest off-line transaction exceeds a predetermined time limit. These processes are described more completely below. From step 335, the method 300 terminates and the terminal returns to the idle state.

Returning now to step 320, the method 300 will proceed to step 340 and transmit current transaction data to the authorization host computer for authorization if the terminal scoring algorithm determined that the transaction data must be transmitted to the authorization host computer (step 310)or if the stored off-line transactions exceed the predetermined quantity or age (step 315). If, at step 310, the method 300 determined that additional information is required prior to transmitting the transaction data to the authorization host computer, the method proceeds to step 345 and prompts the merchant to enter additional information prior to proceeding to step 340.

At step 345, the terminal will prompt the merchant to enter particular types of additional transaction data, which is determined according to parameters stored in the transaction terminal. In most cases, the first additional information requested will be identification data, such as the customer's drivers license. If the license has a magnetic stripe, it will be swiped through the transactions terminal's card swipe slot. This will allow the transaction terminal to automatically capture the desired drivers license data, which may include the customer's name, address, drivers license number, etc. If the license does not have a magnetic stripe, the merchant will use the keypad to manually enter the requested data, such as the drivers license number and identification type. Other types of information that may be requested at this step include a product code, customer telephone number, customer social security number, or any other information deemed relevant by the merchant and check acceptance service. After the additional identification information is provided at step 345, the method proceeds to step 340.

At step 340, the terminal initiates communications with the authorization host computer and transmits a transaction packet, which includes the transaction data and other data. If the transaction terminal has any stored off-line transaction packets, the transaction packet will include a flag indicating that there are stored off-line transaction packets that need to be uploaded to the host computer. If the transaction terminal is capable of providing additional interactive data in response to prompts provided by the host computer, the transaction packet will include a flag indicating that interactive responses are available. As described above, the authorization host computer applies a risk scoring algorithm to the transaction data in order to determine the likelihood that the check will be returned unpaid to the merchant. The format and content of a typical transaction packet are illustrated below:

```
<STX> nnnnnn <FS> 9T123456780T
12345678901200101 <FS> H 15 <FS> 053.44 <FS>
T20.00 <FS> R@ <FS> 405121212 <FS> 589 <FS>
U <FS> L04/04/94 <FS> 8P <FS> X <ETX> <LRC>
```

The transaction packet is interpreted as follows:

| Tag Field | Description | Value |
|---|---|---|
| — | Start of text | <STX> |
| — | Subscriber number | nnnnnn |
| — | Field Separator | <FS> |
| 9 | Raw check data in TOAD format | T123456780 T123456789012 0101 |
| H | Check status and confidence level | Status 1 or U.S. format check, confidence 5 out of 5 potential range. A confidence 3 will ask to re-swipe check. |
| 0 | Total check amount | 53.44 |
| T | Cash back amount | 20.00 |
| R | Write control character | @ |
| 4 | ID number used in conjunction with MICR to verify check | 05121212 |
| 5 | ID type used | 89 or Texas drivers license |
| U | Interactive responses available from host | U |
| L | Terminal Application Program Revision Date | 04/04/94 |
| 8 | Check type - personal (P) or company (C) | P, personal check determined |
| X | Off-line transactions present | X |
| — | End of Text | <ETX> |
| — | Longitudinal Redundancy Check | <LRC> |

Those skilled in the art will be familiar with the TOAD format, which is used to transmit the non-numeric banking symbols that are used in the MICR characters. These include:

| Transmitted Symbol | MICR Banking Symbol |
|---|---|
| T | Transit sign |
| O | On us sign |
| A | Amount |
| D | Dash |

After the transaction packet is transmitted to the authorization host computer at step 340, the method 300 proceeds to step 350, and the terminal waits for a response from the authorization host computer. The format and content of a typical response packet are illustrated below:

```
<STX> APPROVED 1234 <ETX> <LRC>
```

The response packet is interpreted by the terminal as follows:

| Tag Field | Description | Value |
|---|---|---|
| — | Start of text | <STX> |
| — | Authorization Indicia | APPROVED 1234 |
| — | End of text | <ETX> |
| — | Longitudinal Redundancy Check | <LRC> |

If the authorization host computer determines that it needs additional information from the merchant and the transaction packet indicated that the terminal is capable of interactive responses, the response packet will indicate the need for addition information. Generally described, the authorization host computer will provide the desired prompts to the transaction terminal. The prompts correspond to the additional information that the host computer has determined it needs before issuing a response. If the method 300 determines that the authorization host computer has requested additional information, the method proceeds to step 355. If no additional information is required, the method advances to step 360.

At step 360, the authorization process is complete and an authorization indicia received from the authorization host computer is displayed on the transaction terminal's display. As mentioned above, the authorization indicia will indicate to the merchant whether the check should be accepted or declined. If accepted, the preferred authorization indicia will include a multi-digit approval code that the merchant will record on the check. If the check is declined, the authorization indicia may indicate whether the check was declined as a result of negative data associated with the check writer, or because the result of the scoring algorithm indicated that the likelihood that the check would be returned is greater than the level that is acceptable to the merchant. In either case, the merchant may ignore the authorization indicia and accept the check. However, the risk of loss associated with such checks would be borne entirely by the merchant. After the authorization indicia is displayed, the method 300 terminates and the terminal returns to the idle state.

Returning now to step 355, once the interactive process has been initiated by the authorization host computer and the terminal has received prompts corresponding to the requested data, the terminal terminates the telephone call and disconnects from the authorization host computer. Those skilled in the art will appreciate that this allows the merchant to enter additional data into the terminal without continuing to accrue communications costs associated with a connection to the authorization host computer.

At step 365, preferred transaction terminal will display "More Info Needed. Press [ENTER]." If the merchant presses the enter key, the transaction terminal will display the prompts and the merchant will enter the requested information in response to the prompts. Alternatively, the merchant may prefer to cancel the transaction and accept another form of payment. In this case, the merchant will press the cancel key, and the transaction terminal will display "Clear Last Trans?" Pressing the "no" key will return the terminal to the prompts. Pressing the "yes" key will cause the last transaction to be erased and the terminal will return to the idle state.

When the requested additional data is entered, the method proceeds to step 370, where the transaction terminal initiates a telephone call to the authorization host computer. At step 370 the transaction terminals transmits the new transaction packet to the host computer. The new transaction packet includes all of the data in the original packet, which was stored in the terminal, and the new data entered in response to the prompts. In addition, the transaction packet includes a tag indicating that interactive prompting responses are included in the transaction packet. This will prevent the host computer from requesting additional information from the transaction terminal via the interactive process. The format and content of a typical transaction packet sent at step 370 are illustrated below:

```
<STX>nnnnnn <FS> 9T123456780T
12345678901200101 <FS> H 15 <FS> 053.44
<FS> T20.00 <FS> R@ <FS> 405121212 <FS>
589 <FS> V <FS> L04/04/94 <FS> 8P <FS>
W2135554444 <FS> XSMITH <ETX> <LRC>
```

The transaction packet is interpreted as follows:

| Tag Field | Description | Value |
|---|---|---|
| — | Start of text | <STX> |
| — | Subscriber number | nnnnnn |
| — | Field Separator | <FS> |
| 9 | Raw check data in TOAD format | T123456780 T123456789012 0101 |
| H | Check status and confidence level | Status 1 or U.S. format check, confidence 5 out of 5 potential range. A confidence 3 will ask to re-swipe check. |
| 0 | Total check amount | 53.44 |
| T | Cash back amount | 20.00 |
| R | Write control character | @ |
| 4 | ID number used in conjunction with MICR to verify check | 05121212 |
| 5 | ID type used | 89 or Texas drivers license |
| V | Interactive prompting response contained in packet | |
| L | Terminal Application Program Revision Date | 04/04/94 |
| 8 | Check type - personal (P) or company (C) | P, personal check determined |
| W | Telephone number | 2135554444 |
| X | Mothers maiden name | SMITH |
| — | End of Text | <ETX> |
| — | Longitudinal Redundancy Check | <LRC> |

After the transaction packet is transmitted at step 370, the method proceeds to step 360, where it waits to receive a response packet from the authorization host computer. Once the response packet is received at step 360, the authorization indicia is displayed on the terminal's display. The method 300 then terminates and the terminal returns to the idle state.

Entering Transaction and Payment Data Into the Terminal

Figure 7:
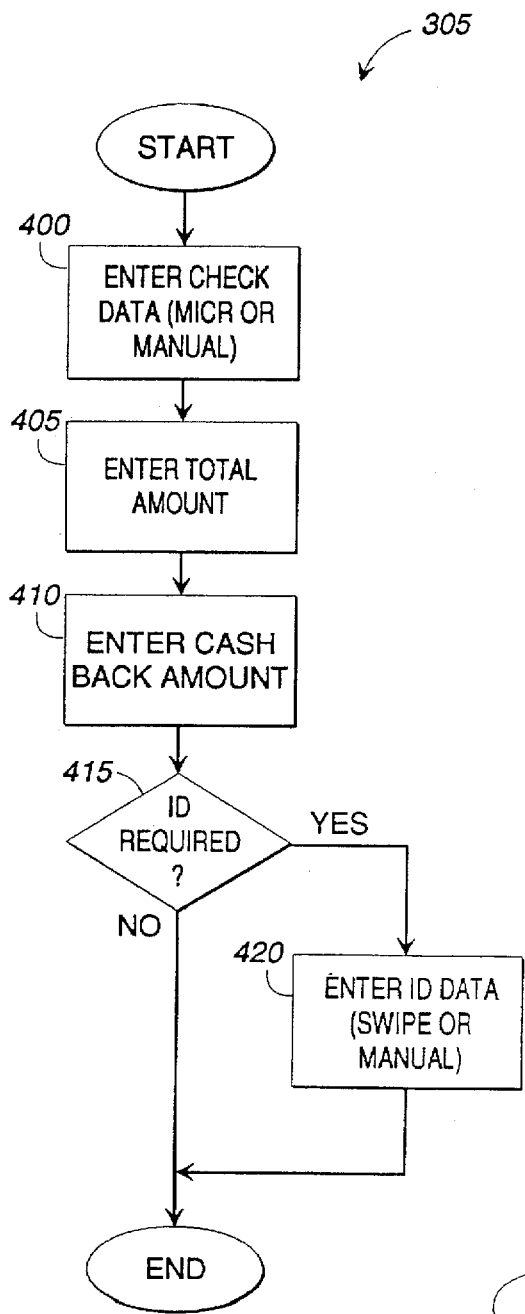
FIG. 7 is a flow diagram illustrating the preferred method for entering transaction data into the electronic check transaction terminal at the point of sale, which forms a part of the method of FIG. 6.

FIG. 7 is a flow diagram illustrating the preferred method 305 for entering transaction data into the transaction terminal. This method forms a part of method 300 that was described above in conjunction with FIG. 6. The method 305 begins at step 400 when the merchant enters check data into the transaction terminal. In the preferred method, the transaction terminal will be in an idle state until the merchant initiates a transaction by inserting a check into the MICR reader or pressing the appropriate key on the keypad. If the check is read by the MICR reader, the transaction terminal will read and store the account number, bank transit number, check sequence number, and attempt to determine whether the check is a personal check or a company check. If the terminal is unable to determine from the MICR characters whether the check is a personal or company check, the terminal will prompt the merchant to indicate the proper type. If the check data is entered manually, the transaction terminal will prompt the merchant to enter the same data in a predetermined sequence. After the check data is entered into the transaction terminal, the method proceeds to step 405.

At step 405, the transaction terminal prompts the merchant to enter the check amount using the terminal's keypad.

At step 410, the merchant is prompted to enter the amount of cash, if any, that will be returned to the customer. This option is selectively enabled so that the prompt would not appear if a merchant has determined that he will not cash third party checks or accept checks written for more than the amount of the purchase.

At step 415, the method determines whether customer identification data is required at this point. If so, the method proceeds to step 370. Customer identification data may be required for a variety of reasons. In the preferred system, customer identification data will be required if the customer is attempting to cash a third party check. This allows the check acceptance service to perform a dual evaluation based on the check writer, which is identified by the MICR characters, and the customer, which is identified by the identification data. Identification data may also be used if the merchant is using the transaction terminal to collect name and address data for check writing customers. If the merchant has elected to collect identification information in all cases, it may be accomplished by requiring the data to be entered at this point, or by selecting the appropriate parameters in the terminal risk scoring algorithm. If the terminal scoring algorithm's parameters are set to require identification data in all cases, the identification information will not be required at step 415. If identification information is not required at step 415, the method proceeds to step 310 of the method 300 (FIG. 6).

At step 420, the transaction terminal prompts the merchant to enter customer identification data. In most cases, the merchant will ask to see the customer's drivers license. If the license includes a magnetic stripe, the license will be swiped through the transaction terminal's card swipe slot and the relevant data will be captured. At a minimum, this data will include the drivers license number and state of issue. In most cases, it will also be possible to capture additional information such as the customer's name, address, etc. If the data is entered manually, the terminal will prompt the merchant to enter the drivers license number and the state.

After the data is entered and stored in the terminal's memory, the method proceeds to step 310 of method 300 (FIG. 6).

Remote Authorization Method

FIG. 8, which consists of FIGS. 8a and 8b, is a flow diagram illustrating the preferred method 500 for operating an authorization host computer associated with a check acceptance service. Those skilled in the art will understand that the preferred method 500 is implemented as program code for the authorization host computer 35.

The preferred method begins at step 505, where a transaction packet from the transaction terminal is received by the host computer's front end processor. The format and content of a typical transaction packet is described above in conjunction with FIG. 6. The front end processor translates the transaction packet into its constituent data.

At step 510, the front end processor passes the translated or interpreted data to the authorization host computer. If the transaction packet indicates that the customer will be receiving cash back, the preferred method 500 requires that the host computer separately score the cash back portion of the transaction and the remaining amount. The host calculates the remaining amount by subtracting the cash back amount from the total check amount entered by the merchant. Each subtotal is then treated separately by the scoring system in order to apply the appropriate scoring parameters to the purchase and cash portions of the transaction. Those skilled in the art will understand that the purchase and cash back amounts could be scored together depending on the capabilities of the authorization host computer and the requirements and preferences of the statisticians and programmers implementing the method.

At step 515, the host computer searches the merchant file for the merchant record corresponding to the merchant identification number received in the transaction packet. As mentioned earlier, the merchant record indicates whether the merchant's account is active and the eligible service options available to the merchant.

At step 520, the host computer searches the negative file for negative information associated with the check writer. This is done by searching the negative file for one or more records that match the checking account number or drivers license number. As described above, the negative file includes data indicating that previous checks tendered by the customer were returned for some reason, and have not be collected. At step 525, the host computer determines whether the negative file contains a record matching the checking account number or the identification data (e.g., drivers license number). If so, the method proceeds to step 530. If not, the method proceeds to step 535.

If the negative file does not include a record associated with the checking account number or the identification data, the method proceeds to step 535. At step 535, the host computer searches the positive file for records of previous check writing activity that correspond to the checking account number or the identification data received from the terminal.

At step 540, the transaction is scored by the risk scoring algorithm implemented on the authorization host computer. If no positive data was found in the positive file, the risk scoring algorithm uses the data in the transaction packet and other known variables such as time of day, etc. If positive data was found in the positive file, the risk scoring algorithm uses the positive file data, along with the data in the transaction packet and other known variables. As mentioned briefly above, if cash will be given to the customer, the cash back amount and check amount are scored separately.

At step 545, the host computer calculates a transaction score by accumulating the scoring totals associated with each date element. The authorization host computer then determines whether the transaction score is equal to or greater than a predetermined level that is determined by the merchant's scoring model. As mentioned above, each merchant's scoring model is designed around the merchant's risk tolerance. The merchant will determine the level of risk that is too great. This will be determined in consideration of the level of customer service that the merchant desires to provides to his customers, the number of good checks he is willing to decline, and the number of bad checks he is willing to accept. If the transaction score is equal to or greater than the threshold value needed for approval (indicating a sufficiently low risk of loss), the method proceeds to step 550. If not, the method proceeds to step 530.

At step 550, the host computer transmits a response packet, which includes an authorization indicia, to the transaction terminal. In the case of an approval, the authorization indicia will include a four digit approval code. In most cases, the merchant will be required to record the approval code on the check, along with the merchant's identification number. The four digit approval code is may be used to validate that the transaction was authorized by the authorization host computer. The four digit number is specific to the data elements used for authorization. For example, the approval code may be derived from the merchant identification number, drivers license number, date, purchase amount, etc. In the event that an approved check becomes uncollectable, the approval code will be necessary in order for the merchant and check acceptance service to review the transaction and determine what data was available during authorization.

After the authorization host computer transmits the response packet to the transaction terminal, the method 500 proceeds to step 555. At step 555, the method determines whether there are any off-line transaction packets stored in the terminal. The presence of off-line transaction packets is indicated by a field in the transaction packet, as discussed above in conjunction with FIG. 6. The process by which off-line transactions are up-loaded is described more completely below in conjunction with FIG. 9.

From step 555, the method 500 proceeds to step 560 where the authorization host computer terminates the call, and logs the call as complete in both a billing entry log and a transaction log, which form a part of the administrative file 102. Properly logging such calls is necessary in order to allow the check transaction service to properly bill the merchant for the services provided, and to keep track of the checks that have processed by the check acceptance service. From step 560, the method 500 is terminated and the authorization host computer returns to an idle state.

Returning now to step 530, the response to negative data or an insufficient risk scoring outcome will be described. Generally, the method 500 must determine whether to decline the transaction based on the negative data (step 525)or the insufficient risk scoring outcome (step 545), or whether to request additional data from the merchant.

Those skilled in the art will appreciate that prior art check acceptance systems included two options at this juncture. The first option is to simply send a decline authorization indicia if the host computer located negative data in the negative file or if the outcome of the risk scoring algorithm fell below the merchant's threshold. The second option is to send a "call center" signal to the terminal.

The disadvantage to sending a negative authorization indicia in these circumstances is that the merchant may end up refusing good checks that could be approved if additional information were available to the check acceptance service. Such additional data may be used for re-scoring the transaction or for verifying the customer's identity. For example, although the negative file indicates checks were forged, the merchant may be able to request identification or verifying information indicating that the customer is the person to whom the checking account belongs. Likewise, the identity of the person may be verified by requesting the customer's mother's maiden name. In addition, a transaction that falls slightly below the scoring threshold may be approved if the check acceptance service is able to get additional risk scoring information, or information verifying the identity of the person.

In prior art methods, the only way to obtain this additional information is to send a "referral" or "call center" signal to the transaction terminal. Upon the receipt of a referral-type authorization indicia, the communication link between the transaction terminal and the host computer would be terminated, and the merchant would be required to place a telephone call to an operator at the check acceptance service. The operator would then review the known transaction data and ask the merchant to provide various types of additional information. After the operator keyed this information into a computer terminal, the host computer would re-score or verify the transaction and provide an authorization indicia to the operator, who would relay it audibly to the merchant. This process is very cumbersome and time consuming, and results in what most merchants consider to be unacceptable delays to their customers at the point of sale.

The system of the present invention avoids the problems of the prior art by providing a transaction terminal 15 that is capable of interactive data acquisition. This allows the authorization host computer to send data to the transaction terminal indicating the prompts for the desired additional information. The terminal then displays the prompts to the merchant. The merchant would then request the additional information from the customer and enter the additional data into the transaction terminal. At that point, the transaction terminal dials the host computer and transmits a new transaction packet that includes all of the original transaction data, which was stored in the transaction terminal, and the additional data acquired in response to the prompts. The authorization host computer then re-processes the transaction using all of the available information.

At step 530, the authorization host computer determines whether the transaction terminal that sent the transaction packet is capable of providing interactive responses. In the preferred system, this is determined by checking for the presence of the appropriate tag field in the transaction packet. Those skilled in the art will understand that this could also be accomplished by other means. For example, the merchant data associated with the merchant identification number (transmitted by the terminal) could identify the transaction terminal as being capable of providing interactive responses. If interactive responses are not available, the method proceeds to step 570. If interactive responses are available, the method proceeds to step 575.

At step 570, the authorization host computer transmits a decline authorization indicia or a "call center" signal. In the preferred system, the authorization indicia "4" indicates that the check has been declined because of data located in the negative file. A "3" indicates that the check has been declined because the scoring algorithm determined the risk of loss was too high. The determination as to whether to decline the transaction or seek additional data from the merchant via an instruction to call the check acceptance service's operator is made based on the relationship between the transaction score or negative data and the particular merchant's risk parameters. After the decline signal or "call center" signal is sent to the transaction terminal, the method proceeds to check for off-line transactions (step 555), and terminates and logs the call (step 560), as described above.

Returning now to step 575, if the authorization host computer determines that interactive responses are available from the terminal (step 530), the authorization host computer determines whether to request additional data from the terminal. This determination is based on several factors. For example, the host computer may not seek additional data if the outcome of the risk scoring algorithm is below a predetermined threshold, or if the negative data was of a particular type. Likewise, the authorization host computer will not request additional information if the current transaction data was provided in response to an earlier request for additional data. This may be determined from the presence of the appropriate flag, as discussed above in conjunction with step 370 of FIG. 6. If the authorization host computer determines not to request additional data from the merchant, the method proceeds to step 570, and continues in the manner described above.

On the other hand, additional data may be useful if the scoring outcome is marginal, or even if negative data was found and the check will be declined. Those skilled in the art will appreciate that additional data may be used to re-score the transaction or to validate the customer's identity. The additional data may affect the outcome of the risk scoring algorithm and result in an approved transaction. For validation, the authorization host computer may request a variety of information, including telephone number, social security number, mother's maiden name, etc.

Even if the check will be declined, the authorization host computer may also request interactive data in order to update files related to the check writer, and to attempt to gain additional information that may assist the check acceptance service in its efforts to collect previous bad checks from the check writer. For example, obtaining a current address and/or phone number from a check writer with outstanding bad checks may facilitate the check acceptance service's efforts to collects payment for those bad checks. If the method determines that additional information should be requested from the merchant, the method proceeds to step 580.

At step 580, the authorization host computer transmits prompts to the transaction terminal. The prompts correspond to the additional data that the host computer has determined it needs before issuing a response. The format and content of a response packet including prompts for additional data are illustrated below:

```
<STX> xTelephone Number <FS> GSocial Security Number
<FS> zMother's Maiden Name <FS> <ETX> <LRC>
```

The response packet is interpreted by the terminal as follows:

| Tag Field | Description | Value |
|---|---|---|
| — | Start of text | <STX> |
| — | Field Separator | <FS> |
| x | Prompt for: | Telephone Number |
| G | Prompt for: | Social Security Number |
| z | Prompt for: | Mother's Maiden Name |
| — | End of text | <ETX> |
| — | Longitudinal Redundancy Check | <LRC> |

After the appropriate prompts are transmitted at step 580, the method proceeds to step 585 and terminates the connection between the transaction terminal and the host computer. The host computer does not log this call. Those skilled in the art will appreciate that terminating the original call while the merchants obtains and enters the addition information greatly reduces the telecommunications costs associated with communications between the transaction terminal and the host computer. This also makes communication facilities at the check acceptance service available to other merchant terminals that place calls to the host computer during this time period. However, those skilled in the art will appreciate that the system can be implemented so that the transaction terminal and authorization host computer remain connected to each other during the process of obtaining interactive additional data. From step 585, the method 500 terminates and the authorization host computer returns to an idle state.

Up-loading Stored Off-Line Transactions

FIG. 9 is a flow diagram illustrating the preferred method 555 for up-loading off-line transaction packets during a normal communication session between the transaction terminal and the authorization host computer. The method 555 forms a part of the preferred method for remote authorizations 500 illustrated in FIGS. 8a and 8b.

The method 555 begins at step 600, where the authorization host computer determines whether there are any off-line transaction packets stored in the transaction terminal. This is accomplished by determining whether the transaction packet received from the transaction terminal includes a tag field indicating that off-line authorizations are present. If not, the method returns to method 335 of FIG. 8b.

If the tag field indicates off-line transaction packets are stored in the terminal, the method proceeds to step 605, where the authorization host computer sends a request to the transaction terminal requesting that the transaction terminal upload the off-line transaction packets stored in its buffer. After the authorization host computer transmits the request, the terminal will display the prompt associated with the terminal's idle state if the merchant presses the terminal's "clear" key. However, the processing of the off-line transaction packets continues and the call is not terminated.

At step 610, the authorization host computer receives the off-line transaction packets that are stored in the terminal's buffer. The format and content of the off-line transaction packets are illustrated below:

```
<STX>nnnnnn <FS> 9T123456780T
12345678901200101 <FS> H 15 <FS> 053.44 <FS>
T20.00 <FS> R@ <FS> 405121212 <FS> 589 <FS>
04/04/94 <FS> 8P W Approved XXXX <ETX> <LRC>
```

The transaction packet is interpreted as follows:

| Tag Field | Description | Value |
|---|---|---|
| — | Start of text | <STX> |
| — | Subscriber number | nnnnnn |
| — | Field Separator | <FS> |
| 9 | Raw check data in TOAD format | T123456780 T123456789012 0101 |
| — | Field Separator | <FS> |
| H | Check status and confidence level | Status 1 or U.S. format check, confidence 5 out of 5 potential range. A confidence 3 will ask to re-swipe check. |
| O | Total check amount | 53.44 |
| T | Cash back amount | 20.00 |
| R | Write control character | @ |
| 4 | ID number used in conjunction with MICR to verify check | 05121212 |
| 5 | ID type used | 89 or Texas drivers license |
| L | Terminal Application Program Revision Date | 04/04/94 |
| 8 | Check type - personal (P) or company (C) | P, personal check determined |
| W | Terminal Authorized Transaction | Approved XXXX |
| — | End of Text | <ETX> |
| — | Longitudinal Redundancy Check | <LRC> |

As illustrated, the off-line transaction packets include the same information as a normal transaction packet, with the addition of the terminal generated approval code. The last off-line transaction packet from the transaction terminal includes and "end of text" tag indicating to the host computer that it is the last transaction packet. At that point, the transaction terminal clears its off-line transaction buffer. The method 555 then returns to step 560 of the method 500 (FIG. 8b).

Capturing Customer's Name and Address

As discussed briefly above, customer name and address data may be used for a variety of purposes. Although the check acceptance service's data bases are usually searched according to MICR data or a drivers license number, they may also be searched by the customer's name and address. In addition, once the check acceptance service is able to append a customer's name to the other data maintained in the positive file, the check acceptance service is able to provide the customer's name along with subsequent approval codes. Thus, if a terminal displays "APPROVED 2457 JOHN SMITH," the merchant can verify that the customer is in fact Mr. Smith. Name and address information may also be useful to merchants who want to compile of list of their check writing customers. Such a list would facilitate a merchant's efforts to increase sales by sending advertisements, coupons, etc. to known customers.

Although such information is valuable to the merchant and the check authorization processor, prior art check acceptance systems did not facilitate the collection of such information. However, the preferred transaction terminal 15 allows merchants to quickly and efficiently capture name and address information by electronically reading magnetic stripe drivers licenses. Therefore, in states that issue drivers license having magnetic stripes, a merchant may capture name and address information by simply swiping the customer's drivers license through the terminal's magnetic stripe reader.

In the preferred system, the transaction packet sent by the terminal will include name and address of the customer if the customer's drivers license has been swiped as part of the transaction. The format and content of a transaction packet that includes name and address data is illustrated below:

```
<STX>nnnnnn <FS> 9T123456780T
12345678901200101 <FS> H 15 <FS> 053.44
<FS> T20.00 <FS> RA <FS> 405121212 <FS>
M[track 1 data] <FS> N[track 2 data] <FS>
L04/04/94 <FS> 8P <ETX> <LRC>
```

The transaction packet is interpreted as follows:

| Tag Field | Description | Value |
| --- | --- | --- |
| — | Start of text | <STX> |
| — | Subscriber number | nnnnnn |
| — | Field Separator | <FS> |
| 9 | Raw check data in TOAD format | T123456780 T123456789012 0101 |
| — | Field Separator | <FS> |
| H | Check status and confidence level | Status 1 or U.S. format check, confidence 5 out of 5 potential range. A confidence 3 will ask to re-swipe check. |
| O | Total check amount | 53.44 |
| T | Cash back amount | 20.00 |
| R | Write control character | A |
| 4 | ID number used in conjunction with MICR to verify check | 05121212 |
| M | Track 1 Data | [track 1 data] |
| N | Track 2 Data | [track 2 data] |
| L | Terminal Application Program Revision Date | 04/04/94 |
| 8 | Check type - personal (P) or company (C) | P, personal check determined |
| — | End of Text | <ETX> |
| — | Longitudinal Redundancy Check | <LRC> |

The name and address data will be retained by the authorization host computer if the data is not already included in the check acceptance service's data bases, or if the previously acquired data needs to be updated. If the name and current address are already in the data bases, the new data will simply be discarded by the authorization host computer.

FIG. 10 illustrates an alternative method 650 for transmitting name and address data to the authorization host computer. The present inventors believe this alternative method is useful in systems where the time required to send name and address data as part of every transaction packet is too great. This may be the case where the terminal employs a slower modem, or where the amount of data being transmitted is so great that sending it in the primary transaction packet delays the transaction. The alternative method 650 addresses this problem by sending essential transaction related data in a first transaction packet, which allows the authorization host computer to begin to process the data. The optional data, such as name and address, are transmitted in a second transaction packet. If the authorization host computer determines that it does not need the optional data, it sends a signal to the terminal indicating that the transmission of the optional data should be terminated.

The flow chart of FIG. 10 is intended to provided a general flow diagram of the alternative method, and includes processes that are executed by the transaction terminal and by the authorization host computer. Those skilled in the art will understand that the specific steps required to implement the alternative method are similar to those discussed in conjunction with the methods of FIGS. 6 and 8. Likewise, those skilled in the art will understand that although the method is discussed in conjunction with the transmission of name and address data, the method is applicable to any type of data that may be sent in a second data packet.

The method begins at step 655, where the terminal transmits the initial transaction packet to the authorization host computer. The transaction packet transmitted at this point does not include the name and address data, and is similar to the transaction packets discussed above in conjunction with FIGS. 6 and 8.

At step 660, the terminal begins to transmit a second data packet that includes the name and address data. This occurs while the terminal is waiting for the authorization host computer to provide an authorization indicia in response to the data included in the initial transaction packet.

At step 665, the authorization host computer determines whether it needs the incoming name and address data in order to update its data bases. This is accomplished by searching the positive file to determine whether it already includes name and address data associated with the customer who is identified by the data included in the first packet. If the name and address data is needed, the method proceeds to step 670. If not, the method proceeds to step 675.

At step 670, the authorization host computer provides a response packet, including authorization indicia, to the terminal. At step 680, the authorization host computer continues to receive the name and address data from the terminal. This process may continue after the terminal has displayed the authorization indicia, and after the terminal display returns to the idle prompt. Although the terminal may appear to be idle, the terminal will continue to transmit the name and address data until it is complete. At that point, the call will be terminated.

At step 685, the authorization host computer will store the name and address in the appropriate data bases. After the data is stored, the method terminates.

Returning now to step 675, if the authorization host computer does not need the name and address data, the authorization host computer provides a response packet to the terminal. In addition to authorization indicia, the response packet includes a flag indicating that the authorization host computer does not need the name and address data. At step 690, the terminal terminates transmission of the name and address data. The transaction is then completed in the manner described above in conjunction with FIGS. 6 and 8.

From the foregoing description, it will be understood that present invention provides method and apparatus for an interactive check transaction terminal and for terminal based risk scoring and approval. The present invention facilitates the collection and processing of transaction data collected in conjunction with check transactions.

The present invention has been described in relation to particular embodiments which are intended in all respects to be illustrative rather than restrictive. Alternative embodiments will become apparent to those skilled in the art to which the present invention pertains without departing from its spirit and scope. Accordingly, the scope of the present invention is defined by the appended claims rather than the foregoing description.

What is claimed is:

1. A method for operating an authorization computer to provide interactive authorization indicia in response to transaction data received from a transaction terminal, comprising the steps of:

receiving from said transaction terminal a first transaction packet including said transaction data, said transaction data being associated with a pending transaction;

applying a risk scoring algorithm to at least a portion of said transaction data, said risk scoring algorithm providing a first transaction score;

in response to said first transaction score exceeding a predetermined approval value, approving said transaction by transmitting an approval code to said transaction terminal;

in response to said first transaction score falling below said predetermined approval value, determining whether said transaction terminal is capable of interactive processing;

in response to a determination that said transaction terminal is not capable of interactive processing, declining said transaction by transmitting a decline code to said transaction terminal and terminating communication with said transaction terminal;

in response to a determination that said transaction terminal is capable of interactive processing, transmitting a request for additional information to said transaction terminal;

receiving from said transaction terminal a second transaction packet including said additional information;

applying said risk scoring algorithm to at least a portion of said additional information, said risk scoring algorithm providing a second transaction score;

in response to said second transaction score exceeding a predetermined approval value, approving said transaction by transmitting an approval code to said transaction terminal; and in response to said second transaction score falling below said predetermined approval value, declining said transaction by transmitting a decline code to said transaction terminal and terminating communication with said transaction terminal.

2. A method for operating an authorization computer as recited in claim 1, wherein said transaction data is selected from the group comprising: payment data, identification data, merchant data and product data.

3. A method for operating an authorization computer as recited in claim 1, wherein said first transaction packet comprises interactive processing indicia, and the step of determining whether said transaction terminal is capable of interactive processing comprises detecting said interactive processing indicia.

4. A method for operating an authorization computer as recited in claim 1, wherein said first transaction packet comprises a merchant identification number, and step of determining whether said transaction terminal is capable of interactive processing comprises analyzing data associated with said merchant identification number.

5. A method for operating an authorization computer as recited in claim 1, wherein said additional information comprises identification data associated with a customer.

6. A method for operating an authorization computer as recited in claim 1, further comprising the step of terminating communication between said authorization host computer and said transaction terminal after transmitting said request for additional information.

7. A method for operating an authorization computer as recited in claim 1, further comprising the step of determining whether second transaction packet includes said additional information.

8. A method for operating an authorization computer as recited in claim 7, wherein said second transaction packet includes a response indicating said additional information is present.

9. A method for operating an authorization computer as recited in claim 1, further comprising the steps of:

searching a database for other data corresponding to said transaction data; and applying said risk scoring algorithm to at least a portion of said other data.

10. A method for operating an authorization computer to provide interactive authorization indicia in response to transaction data received from a transaction terminal, comprising the steps of:

receiving from said transaction terminal a first transaction packet including said transaction data, said transaction data being associated with a pending transaction;

applying a risk scoring algorithm to at least a portion of said transaction data, said risk scoring algorithm providing a first transaction score;

in response to said first transaction score exceeding a predetermined approval value, approving said transaction by transmitting an approval code to said transaction terminal;

in response to said first transaction score falling below said predetermined approval value, determining whether said transaction terminal is capable of interactive processing;

in response to a determination that said transaction terminal is not capable of interactive processing, declining said transaction by transmitting a decline code to said transaction terminal and terminating communication with said transaction terminal;

in response to a determination that said transaction terminal is capable of interactive processing, transmitting a request for additional information to said transaction terminal;

receiving from said transaction terminal a second transaction packet including said additional information;

attempting to verify said transaction data using said additional information;

in response to said transaction data being verified by said additional information, approving said transaction by transmitting an approval code to said transaction terminal; and in response to said transaction data not being verified by said additional information, declining said transaction by transmitting a decline code to said transaction terminal and terminating communication with said transaction terminal.

11. A method for operating an authorization computer as recited in claim 10, wherein said transaction data is selected from the group comprising: payment data, identification data, merchant data and product data.

12. A method for operating an authorization computer as recited in claim 10, wherein said first transaction packet comprises interactive processing indicia, and the step of determining whether said transaction terminal is capable of interactive processing comprises detecting said interactive processing indicia.

13. A method for operating an authorization computer as recited in claim 10, wherein said first transaction packet comprises a merchant identification number, and step of determining whether said transaction terminal is capable of interactive processing comprises analyzing data associated with said merchant identification number.

14. A method for operating an authorization computer as recited in claim 10, wherein said additional information comprises identification data associated with a customer.

15. A method for operating an authorization computer as recited in claim 10, further comprising the step of terminating communication between said authorization host computer and said transaction terminal after transmitting said request for additional information.

16. A method for operating an authorization computer as recited in claim 10, further comprising the step of determining whether second transaction packet includes said additional information.

17. A method for operating an authorization computer as recited in claim 16, wherein said second transaction packet includes a response indicating said additional information is present.

18. A method for operating an authorization computer as recited in claim 10, further comprising the steps of:
   searching a database for other data corresponding to said transaction data; and
   applying said risk scoring algorithm to at least a portion of said other data.

19. A method of operating a transaction terminal to provide authorization of a transaction at the point of sale, comprising the steps of:
   receiving transaction data entered into the transaction terminal at the point of sale, the transaction data being associated with a pending transaction;
   applying a terminal-based risk scoring algorithm to the transaction data to determine whether the pending transaction can be approved at the transaction terminal;
   in response to a determination that the pending transaction can be approved at the transaction terminal, calculating an approval code;
   displaying the approval code on a display associated with the transaction terminal;
   storing an off-line transaction packet in a memory associated with the transaction terminal, the off-line transaction packet including at least a portion of the transaction data and at least a portion of the approval code;
   in response to a determination that the pending transaction cannot be approved at the transaction terminal, transmitting a pending transaction packet to a remote authorization host computer for authorization, the pending transaction packet including the transaction data;
   determining that the memory includes at least one previously stored off-line transaction packet; and
   in response to a determination that the memory includes at least one previously stored off-line transaction packet, including in the pending transaction packet a flag indicating that the transaction terminal has a stored off-line transaction packet for transmission to the remote authorization host computer.

20. A method of operating a transaction terminal as recited in claim 19, wherein the transaction data is selected from the group comprising: payment data, identification data, merchant data and product data.

21. A method of operating a transaction terminal to provide authorization of a transaction at the point of sale, comprising the steps of:
   receiving transaction data entered into the transaction terminal at the point of sale, the transaction data being associated with a vending transaction;
   applying a terminal-based risk scoring algorithm to the transaction data to determine whether the pending transaction can be approved at the transaction terminal;
   in response to a determination that the pending transaction can be approved at the transaction terminal, calculating an approval code;
   displaying the approval code on a display associated with the transaction terminal;
   storing an off-line transaction packet in a memory associated with the transaction terminal, the off-line transaction packet including at least a portion of the transaction data and at least a portion of the approval code;
   determining whether the memory includes a predetermined number of previously stored off-line transaction packets;
   in response to a determination that the memory includes a predetermined number of previously stored off-line transaction packets, transmitting a pending transaction packet to the remote authorization host computer for authorization, the pending transaction packet including the transaction data and a flag indicating that the transaction terminal has stored off-line transaction packets for transmission to the remote authorization host computer;
   receiving an authorization indicia from the remote authorization host computer; and
   transmitting the previously stored off-line transaction packets to the remote authorization host computer.

22. A method of operating a transaction terminal to provide authorization of a transaction at the point of sale, comprising the steps of:
   receiving transaction data entered into the transaction terminal at the point of sale, the transaction data being associated with a pending transaction;
   applying a terminal-based risk scoring algorithm to the transaction data to determine whether the pending transaction can be approved at the transaction terminal;
   in response to a determination that the pending transaction can be approved at the transaction terminal, calculating an approval code;
   displaying the approval code on a display associated with the transaction terminal;
   storing an off-line transaction packet in a memory associated with the transaction terminal, the off-line transaction packet including at least a portion of the transaction data and at least a portion of the approval code;
   determining whether the memory includes a previously stored off-line transaction packet that has been stored for at least a predetermined period of time;
   in response to a determination that the memory includes a previously stored off-line transaction packet that has been stored for at least a predetermined period of time, transmitting a pending transaction packet to a remote authorization host computer for authorization, the pending transaction packet including the transaction data and a flag indicating that the transaction terminal has a stored off-line transaction packet for transmission to the remote authorization host computer;
   receiving an authorization indicia from the remote authorization host computer; and
   transmitting the previously stored off-line transaction packet to the remote authorization host computer.

23. A method of operating a transaction terminal to provide authorization of a payment for a transaction at the point of sale, comprising the steps of:
   storing in said transaction terminal predetermined risk assessment criteria;
   receiving at said transaction terminal transaction information corresponding to a pending transaction;
   applying said risk assessment criteria to said transaction information to determine whether the risk associated with said pending transaction is low, medium, or high;

in response to said risk being low, authorizing said pending transaction by providing authorization indicia;

in response to said risk being medium, attempting to communicate with an authorization host system via a communication means to obtain authorization indicia;

in response to said risk being high, displaying a prompt message on a display associated with said transaction terminal to prompt for entry of predetermined additional information associated with said pending transaction;

receiving said predetermined additional information entered into said transaction terminal via a data entry means; and in response to receipt of said predetermined additional information entered into said transaction terminal, attempting to communicate with said authorization host system via said communication means to obtain authorization indicia.

24. A method for operating a transaction terminal as recited in claim 23, further comprising the step of storing said merchant identification information in said transaction terminal.

25. A method for operating a transaction terminal as recited in claim 23, wherein said authorization indicia is generated internally of said transaction terminal.

26. A method of operating a transaction terminal as recited in claim 23, further comprising the steps of:

storing said authorization indicia in said transaction terminal in association with said transaction information; and transmitting said authorization indicia and said transaction information to a transaction processing host computer system via a communication means during a subsequent communications session.

27. A method of operating a transaction terminal as recited in claim 23, further comprising the step of:

in response to receipt of authorization indicia from said authorization host system, storing said authorization indicia in said transaction terminal in association with said transaction information.

28. A method of operating a transaction terminal as recited in claim 23, further comprising the step of:

subsequent to the step of attempting to communicate with an authorization host system in response to receipt of predetermined additional information, transmitting said predetermined additional information, said merchant identification information, and said transaction information to said authorization host system.

29. A method of operating a transaction terminal as recited in claim 23, wherein said predetermined additional information comprises customer identification information.

30. A method of operating a transaction terminal as recited in claim 29, wherein said data entry means includes a data card reader, and wherein said customer identification information comprises personal identification information entered via a data card.

31. A method of operating a transaction terminal as recited in claim 30, wherein said personal identification information entered via said data card is selected from the group comprising: driver's license information and social security number (SSN) information.

32. A method of operating a transaction terminal as recited in claim 29, wherein said data entry means includes a keypad, and wherein said customer identification information is selected from the group comprising: a personal identification number (PIN), a telephone number, mother's maiden name, and social security number (SSN).

33. A method of operating a transaction terminal as recited in claim 23, wherein said data entry means comprises a keypad.

34. A method of operating a transaction terminal as recited in claim 23, wherein said data entry means comprises a card reader.

35. A method of operating a transaction terminal as recited in claim 23, further comprising the step of obtaining payment form information from a payment form reader in said transaction terminal.

36. A method of operating a transaction terminal as recited in claim 23, wherein said transaction information comprises product identifying information.

37. A method of authorizing a form of payment tendered at the point of sale, comprising the steps of:

entering transaction data into said transaction terminal at the point of sale, said transaction data being associated with a pending transaction;

applying a terminal-based risk scoring algorithm to said transaction data to determine whether said pending transaction can be approved at said transaction terminal;

in response to a determination that said pending transaction can be approved at said transaction terminal, calculating an approval code;

displaying said approval code on a display associated with said transaction terminal;

storing an off-line transaction packet in a memory associated with said transaction terminal, said off-line transaction packet including said transaction data and said approval code;

in response to determination that said pending transaction cannot be approved at said transaction terminal, transmitting a first transaction packet from a transaction terminal to an authorization host system, said first transaction packet comprising at least a portion of said transaction data;

at said authorization host system, determining, based on said first transaction packet, whether to elicit additional information;

at said authorization host system, in response to a determination to elicit additional information, communicating a tag signal to said transaction terminal;

at said transaction terminal, in response to receipt of said tag signal, displaying a prompt;

at said transaction terminal, in response to said displaying of said prompt, receiving additional information entered into said transaction terminal;

at said transaction terminal, communicating a second transaction packet to said authorization host system, said second transaction packet comprising said additional information and said transaction data;

at said authorization host system, determining whether to authorize or decline said transaction based on said second transaction packet; and communicating authorization indicia from said authorization host system to said transaction terminal.

38. A method of authorizing a check transaction as recited in claim 37, wherein said transaction data is selected from the group comprising: payment data, identification data, merchant data and product data.

39. A method of authorizing a check transaction as recited in claim 38, further comprising the step of determining that said memory includes at least one previously stored off-line transaction packet; and wherein said first transaction packet also includes a flag indicating that said transaction terminal has stored off-line transaction packets for transmission to said remote authorization host computer.

40. A method of authorizing a check transaction as recited in claim 37, further comprising the steps of:

determining whether said memory includes a predetermined number of previously stored off-line transaction packets;

in response to a determination that said memory includes a predetermined number of previously stored off-line transaction packets, transmitting said first transaction packet from said transaction terminal to said authorization host system; and transmitting said previously stored off-line transaction packets to said remote authorization host computer.

41. A method of authorizing a check transaction as recited in claim 37, further comprising the steps of:

determining whether said memory includes previously stored off-line transaction packets that has been stored for at least a predetermined period of time;

in response to a determination that said memory includes a previously stored off-line transaction that has been stored for at least a predetermined period of time, transmitting said first transaction packet from said transaction terminal to said authorization host system; and transmitting said previously stored off-line transaction packets to said remote authorization host computer.

42. A method of authorizing a check transaction as recited in claim 37, further comprising the step of:

at said authorization host system, in response to a determination to authorize the transaction, communicating an approval code to said transaction terminal.

43. A method of authorizing a check transaction as recited in claim 42, further comprising the step of:

at said transaction terminal, in response to receipt of said authorization indicia, whenever received, storing said authorization indicia in association with predetermined transaction information and completing said transaction.

44. A method of authorizing a check transaction as recited in claim 37, wherein said step of determining whether to elicit additional information comprises applying a risk scoring algorithm to at least a portion of the data included in said first transaction packet.

45. A method of authorizing a check transaction as recited in claim 37, wherein said step of determining whether to elicit additional information comprises the steps of:

based on said first transaction packet, determining whether to approve said transaction; and based on said first transaction packet, determining whether to decline said transaction.

46. A method of authorizing a check transaction as recited in claim 37, wherein said prompt is displayed on a display associated with said transaction terminal.

47. A method of authorizing a check transaction as recited in claim 37, wherein said additional information is entered into said transaction terminal via a keypad associated with said transaction terminal.

* * * * *